(12) United States Patent
Aoki

(10) Patent No.: US 6,437,712 B1
(45) Date of Patent: Aug. 20, 2002

(54) DATA STREAM CONVERSION APPARATUS AND METHOD, VARIABLE LENGTH CODED DATA STREAM GENERATION APPARATUS AND METHOD, AND CAMERA SYSTEM

(75) Inventor: Yoshifumi Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/858,750

(22) Filed: May 16, 2001

(30) Foreign Application Priority Data

May 18, 2000 (JP) ........................................ 2000-152702

(51) Int. Cl.$^7$ ................................................ H03M 5/06
(52) U.S. Cl. ............................... 341/67; 341/50; 341/65
(58) Field of Search ............................... 341/67, 50, 65

(56) References Cited

U.S. PATENT DOCUMENTS

| | | | | |
|---|---|---|---|---|
| 5,173,695 A | * | 12/1992 | Sun et al. ..................... | 341/67 |
| 5,245,338 A | * | 9/1993 | Sun .............................. | 341/67 |
| 5,663,726 A | * | 9/1997 | Bakhmutsky ................. | 341/67 |
| 5,901,177 A | * | 5/1999 | Sohn ............................ | 375/240 |
| 5,913,229 A | * | 6/1999 | Joo .............................. | 711/200 |
| 6,215,424 B1 | * | 4/2001 | Cooper ......................... | 341/67 |

* cited by examiner

*Primary Examiner*—Michael Tokar
*Assistant Examiner*—Khai M. Nguyen
(74) *Attorney, Agent, or Firm*—Frommer Lawrence & Haug LLP; William S. Frommer; Bruno Polito

(57) ABSTRACT

The present invention discloses a data stream conversion apparatus and method, a variable length coded data stream generation apparatus and method, and a camera system, the data stream conversion apparatus, comprises a first data combining means for successively combining an input variable length data and a data portion not extracted as output data portion in already input data, a data extracting means for successively extracting predetermined data portions of the predetermined data length from said successively combined data as the output data portions, and an output means for successively outputting output data of a predetermined data length based on the successively extracted output data portions.

17 Claims, 19 Drawing Sheets

FIG.19

| CYCLE | 1 | 2 | 3 | 4 | 5 | 6 | | | |
|---|---|---|---|---|---|---|---|---|---|
| CLK1 | | | | | | | | | |
| DATA INPUT | | | | | | | | | |
| ADDED BITS LENGTH a | | 11 | 11 | 11 | 0 | 0 | 0 | 0 | |
| VARIABLE LENGTH CODE LENGTH b | | 16 | 16 | 16 | 0 | 0 | 0 | 0 | |
| REGISTER 233c | | | 27 | 27 | 27 | 0 | 0 | 0 | 0 |
| REGISTER 237d | | 31 | 58 | 58 | 48 | 16 | 16 | 16 | |
| SELECTOR 235d' | | 31 | 26 | 21 | 16 | 0 | 0 | 0 | |
| DATA OUTPUT | | | | | | | | | |

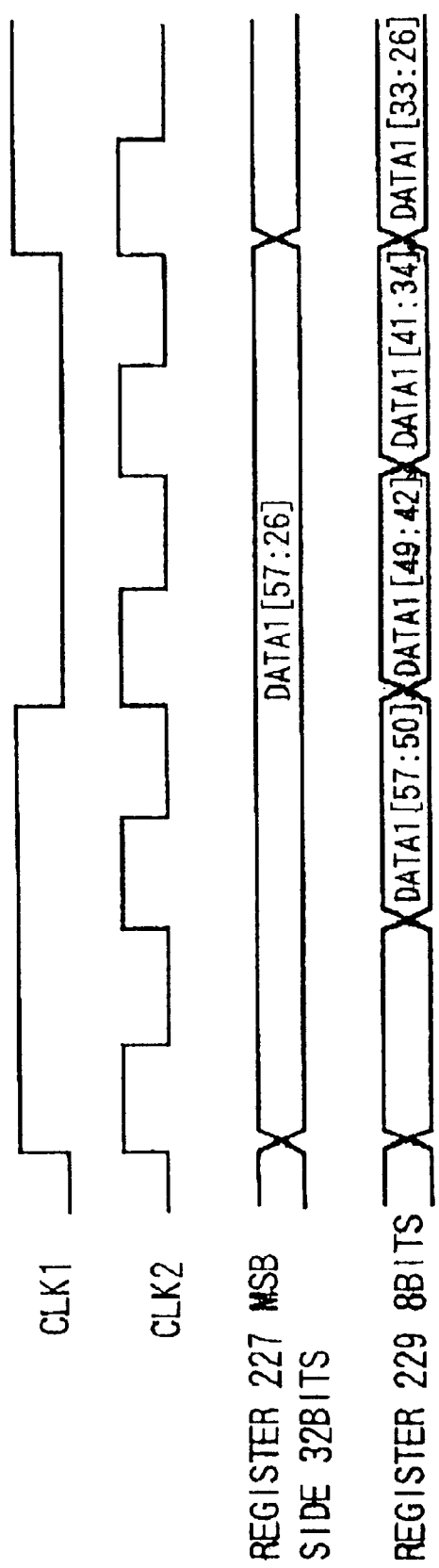

DATA STREAM CONVERSION APPARATUS AND METHOD, VARIABLE LENGTH CODED DATA STREAM GENERATION APPARATUS AND METHOD, AND CAMERA SYSTEM

BACKGROUND OF THE INVENTION

1. Field of the Invention

The present invention relates to a data stream conversion apparatus and method for converting a stream of variable length data to a stream of fixed length data of a predetermined bit length, a variable length coded data stream generation apparatus and method using the data stream conversion apparatus and method for example for JPEG and other variable length coding and efficiently generating a predetermined data stream, and a camera system coding the signal of a captured image by variable length coding.

2. Description of the Related Art

As an internationally standardized system for compressing and coding still picture data, there is known the JPEG (color still image coding system of the Joint Photographic Experts Group). As an internationally standardized system for compressing and coding moving picture data, there is known the MPEG (moving picture coding system of the Moving Picture Coding Experts Group).

One of the systems in broad use as a system for compressing and coding images including these systems is DCT (discrete cosine transform). The standard flow of processing in the DCT coding system is to divide the input image to 8×8 pixel blocks, process the block units by DCT, quantize the obtained DCT coefficients, and code them by variable length coding. Huffman coding etc. are used for the coding at this time.

In this way, for efficient coding, the general practice has been to perform variable length coding at the final stage of the coding of the image data. On the other hand, the data format when recording or transmitting or displaying this coded data is usually data of a predetermined bit length, that is, the processing is usually performed on a data stream of units of data of a fixed length. Therefore, it is necessary to convert the generated variable length coded data into data of a predetermined bit length. The processing for conversion of the data format tends to complicate the control and increase the size of the circuit despite being simple processing. There has therefore been a demand for more efficient conversion with simpler control.

Specifically, for example, since the timing of generation of coded data and the timing of reading of the generated coded data differ, the circuits between them have to be used synchronized with a plurality of operating clocks. This complicated the control. As a result, sometimes the input side was asked to wait or the output side was kept in the ready state. That is, operational limits were imposed on the outside. It had therefore been desired to enable use with a simpler interface.

Further, if data is input and output a synchronously, to prevent data overflow or corruption, the tendency has been to design the circuit with a large number of buffers and registers internally. The size of the circuit has therefore become larger. In particular, when configuring such a coding circuit on an LSI, it is desirable to reduce the size of the circuit as much as possible. The size of the conversion circuit has therefore become a problem.

SUMMARY OF THE INVENTION

An object of the present invention is to provide a data stream conversion apparatus and method for converting a stream of variable length data to a stream of fixed length data of a predetermined bit length by a smaller size of circuit and a simpler configuration and control.

Another object of the present invention is to provide a variable length coded data stream generation apparatus and method for coding desired data by variable length coding to generate a predetermined data stream by a smaller size of circuit and a simpler configuration and control.

Still another object of the present invention is to provide a camera system for capturing a desired image and coding the captured image by variable length coding which codes the captured image data by variable length coding to efficiently generate an image data stream by a smaller size of circuit and a simpler configuration and control.

According to a first aspect of the present invention, there is provided a data stream conversion apparatus, comprising a first data combining means for successively combining an input variable length data and a data portion not extracted as output data portion in already input data, a data extracting means for successively extracting predetermined data portions of the predetermined data length from the successively combined data as the output data portions, and an output means for successively outputting output data of a predetermined data length based on the successively extracted output data portions.

According to a second aspect of the present invention, there is provided a data stream conversion method, comprising the steps of successively combining an input variable length data with a data portion not extracted as output data portion in already input data, successively extracting predetermined data portions of the predetermined data length from the successively combined data as the output data portions, and successively outputting output data of a predetermined data length based on the successively extracted output data portions.

According to a third aspect of the present invention, there is provided a variable length coded data stream generation apparatus, comprising a variable length coding means for coding desired data by variable length coding, a first data combining means for successively combining the variable length coded data resulting from the variable length coding with a data portion not extracted as output data portion in already coded variable length coded data, a data extracting means for successively extracting predetermined data portions of the predetermined data length from the successively combined variable length coded data as output data portions, and an output means for successively outputting data of a predetermined fixed length based on the successively extracted output data portions.

According to a fourth aspect of the present invention, there is provided a variable length coded data stream generation method, comprising the steps of coding desired data by variable length coding, successively combining the variable length coded data resulting from the variable length coding with data portions not extracted as output data in already coded variable length coded data, successively extracting predetermined data portions of a predetermined data length from the successively combined variable length coded data as output data portions, and successively outputting data of a predetermined fixed length based on the successively extracted output data portions.

According to a fifth aspect of the present invention, there is provided a camera system comprising a capturing means for capturing a desired image and generating image data a variable length coding means for coding the generated image data by variable length coding, a first data combining means for successively combining variable length coded data resulting from the variable length coding with portions not extracted as output data portion in already captured variable length coded data, a data extracting means for successively extracting predetermined portions of a predetermined data length from the successively combined variable length coded data as the output data portions, a data stream generating means for successively generating data of a predetermined fixed length to generate a stream of image data based on the successively extracted output data portions, and a processing means for performing predetermined processing on the generated stream of image data.

BRIEF DESCRIPTION OF THE DRAWINGS

These and other objects and features of the present invention will become more apparent from the following description of the preferred embodiments given with reference to the accompanying drawings, in which:

FIG. 19 is a view of the operation of the components relating to the control of the data length in a second specific example of the operation of the bit stream generator shown in FIG. 15; and FIG. 20 is a time chart of the time of data output of the bit stream generator shown in FIG. 15.

DESCRIPTION OF THE PREFERRED EMBODIMENTS

Preferred embodiments will be described with reference to the accompanying drawings.

First Embodiment

First, the basic method and hardware configuration for outputting a stream of variable length coded data (sometimes also simply called "variable length codes") converted to a stream of fixed length data of a predetermined bit length will be explained as a first embodiment with reference to FIG. 1 to FIG. 3.

Figure 1:
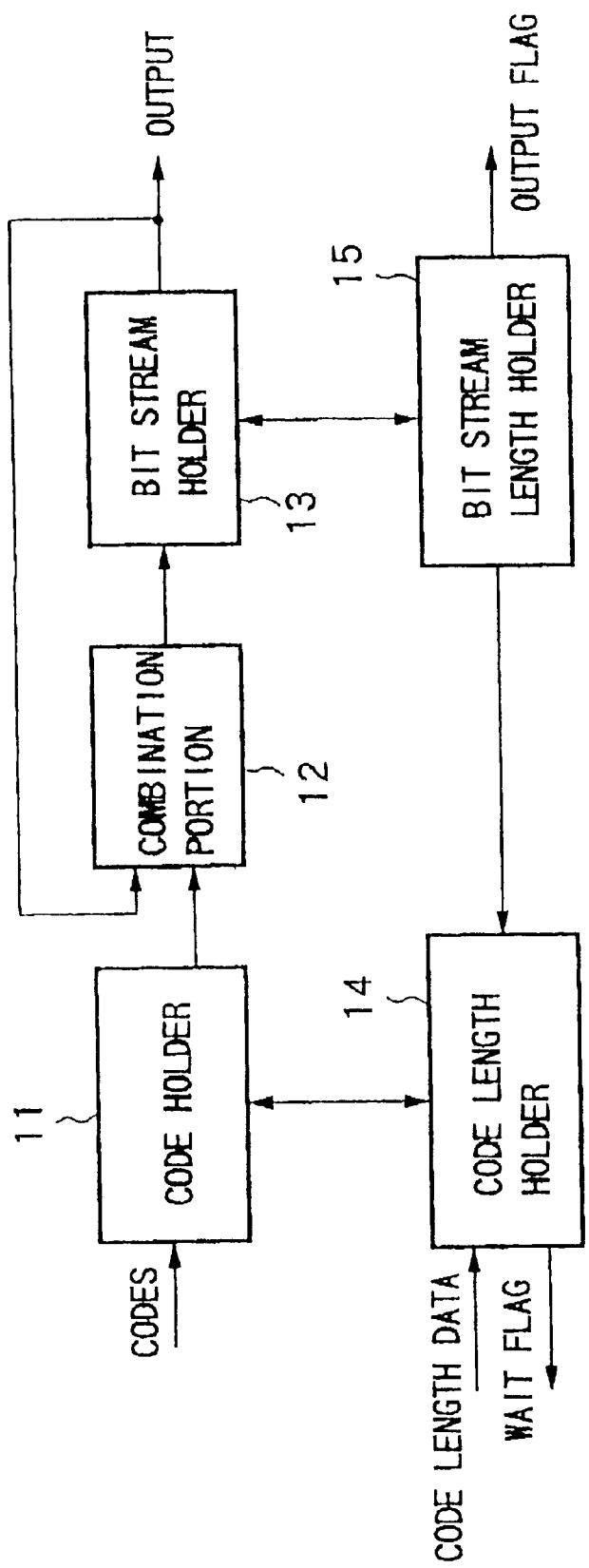
FIG. 1 is a block diagram of the basic configuration of a data stream conversion apparatus according to the present invention.

FIG. 1 is a block diagram of the basic configuration of a data stream conversion apparatus having this function.

A data stream conversion apparatus 10 comprises a code holder 11, a combination portion 12, a bit stream holder 13, a code length holder 14, and a bit stream length holder 15.

The code holder 11 temporary stores the input variable length coded data and outputs it to the combination portion 12.

The combination portion 12 combines the newly input variable length coded data input from the code holder 11 and the fractional bit stream still not output after combination as the bit stream input from the bit stream holder 13 and outputs the result to the bit stream holder 13.

The bit stream holder 13 extracts data of a predetermined bit length from the previously input data of the combined bit stream input from the combination portion 12 and outputs it as the output data. Further, it outputs the nonextracted remaining data to the combination portion 12 to be combined with the next input coded data.

The code length holder 14 holds data of the data length of the valid data held in the code holder 11 based on the data of the code length of the variable length coded data input to the input code holder 11 (data length), the data of the data length of the data transferred from the code holder 11 to the combination portion 12, etc. When input of the new variable length coded data to the code holder 11 is difficult based on this data, a wait flag for causing the input to wait is output to the outside.

The bit stream length holder 15 holds data of the data length of the bit stream held in the bit stream holder 13 based on the data of the data length of the bit stream combined at the combination portion 12 and output to the bit stream holder 13 and data of the data length of the output data. Further, when the data is more than the data length of the output data, since data of a fixed length is output at the next operating cycle, an output flag is output to the outside.

Now, while the data stream conversion apparatus 10 has this basic configuration, several specific configurations for actually realizing it may be considered.

Here, two specific forms will be mentioned and the operation of the data stream conversion apparatus 10 for each form will be explained.

Note that the input coded data is made variable length data of 2- to 16-bit length, while the output bit stream is made a stream of 8-bit length.

Figure 2:
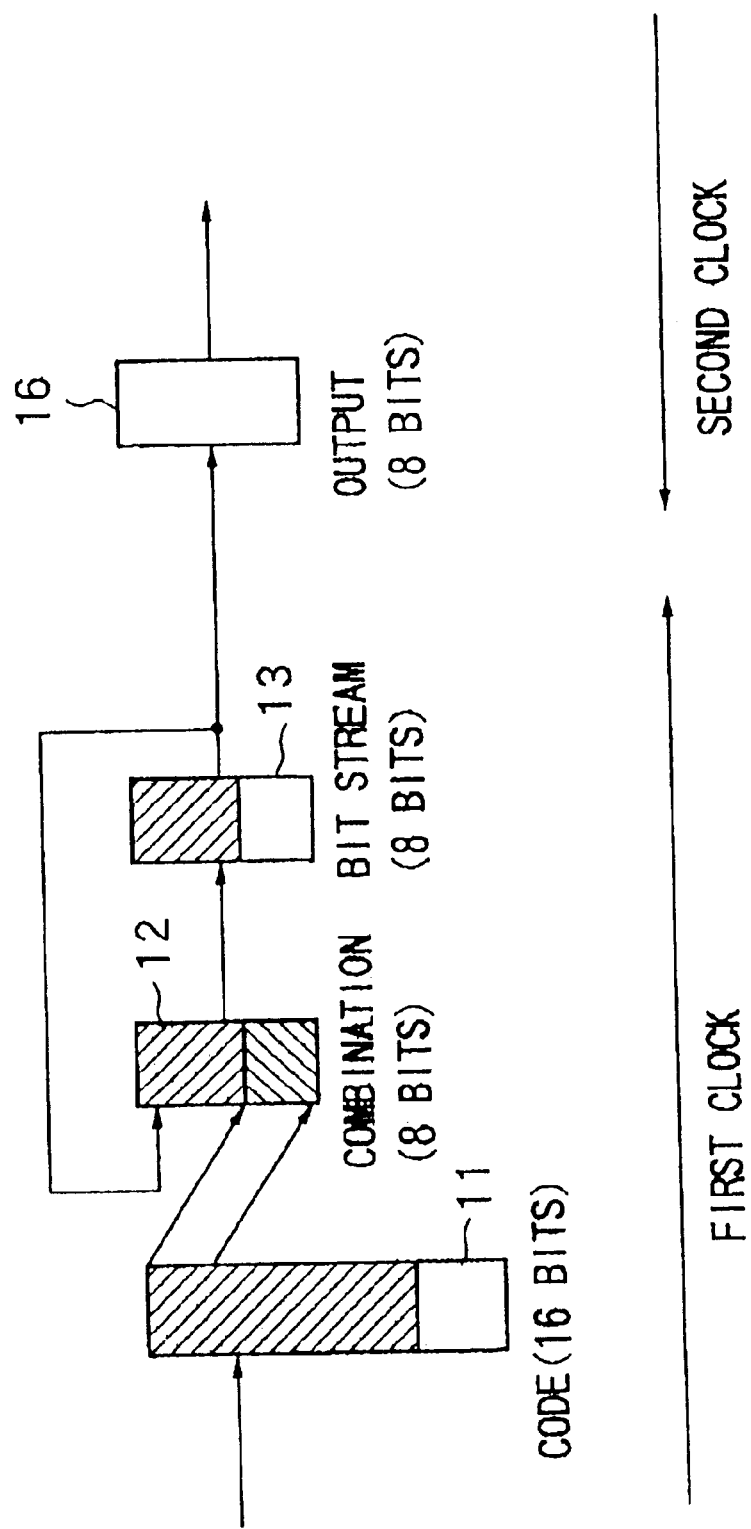
FIG. 2 is a view of a first specific example of the data stream conversion apparatus shown in FIG. 1 and the flow of its processing.

FIG. 2 is a view of the flow of processing in a first specific example of a data stream conversion apparatus 10.

The data stream conversion apparatus 10 shown in FIG. 2 is configured so that the combination portion 12 generates 8 bits of data, is provided with a register of 8 bits or the same as the output data as the bit stream holder 13, and is provided with a register of 16 bits, the largest bit length of the variable length coded data input, as the code holder 11.

In such a configuration, the variable length coded data input to the code holder 11 is transferred a little at a time to the combination portion 12. 8 bits of data are formed at the combination portion 12. That is, first, the number of remaining bits for making 8 bits overall are supplied to the bits left over after output of the variable length coded data input up to then, stored in the bit stream holder 13, 8 bits at a time, to form 8 bits. At this time, in the present embodiment; the bits of the MSB side of the input variable length code are transferred from the code holder 11.

The data combined to 8 bits at the combination portion 12 is stored once in the output register 16 through the bit stream holder 13 and then output.

Next, the variable length coded data stored in the code holder 11 is transferred to the combination portion 12 8 bits at a time from the higher side and similarly stored in the output register 16 through the bit stream holder 13.

Finally, the fractional data less than 8 bits remaining in the code holder 11 is output to the combination portion 12.

After the final data is output to the combination portion 12, the code holder 11 becomes empty, so the next input data is input to the code holder 11.

Further, at the next cycle, the fractional data stored in the bit stream holder 13 and the bits for supplementing the higher fraction of the variable length data newly stored in the code holder 11 are input to the combination portion 12.

Further, when the variable length coded data input to the code holder 11 does not become 8 bits even if combined with the remaining data stored in the bit stream holder 13, the data is input through the bit stream holder 13 to the combination portion 12 once again without being output and is combined with the next variable length coded data.

In the most basic configuration, 8 bits of data are successively generated in this way.

Note that at this time, the code holder 11, the combination portion 12, and the bit stream holder 13 operate in synchronization with a first clock synchronized with the input side circuits, while the output register 16 operates in synchronization with a second clock synchronized with the output side circuits.

However, the data input to the code holder 11 is output to the combination portion 12 a little at a time. Further, while data remains in the code holder 11, new data cannot be fetched into the code holder 11. Therefore, when the transfer of input variable length coded data to the combination portion 12 would take several cycles, the input is kept waiting. The operation is performed by the code length holder 14 which manages the data length of the data stored in the code holder 11.

In such a specific configuration, the sizes of the combination portion 12 and the bit stream holder 13 need only be the data size of the output data, so the circuit size can be made smaller.

Figure 3:
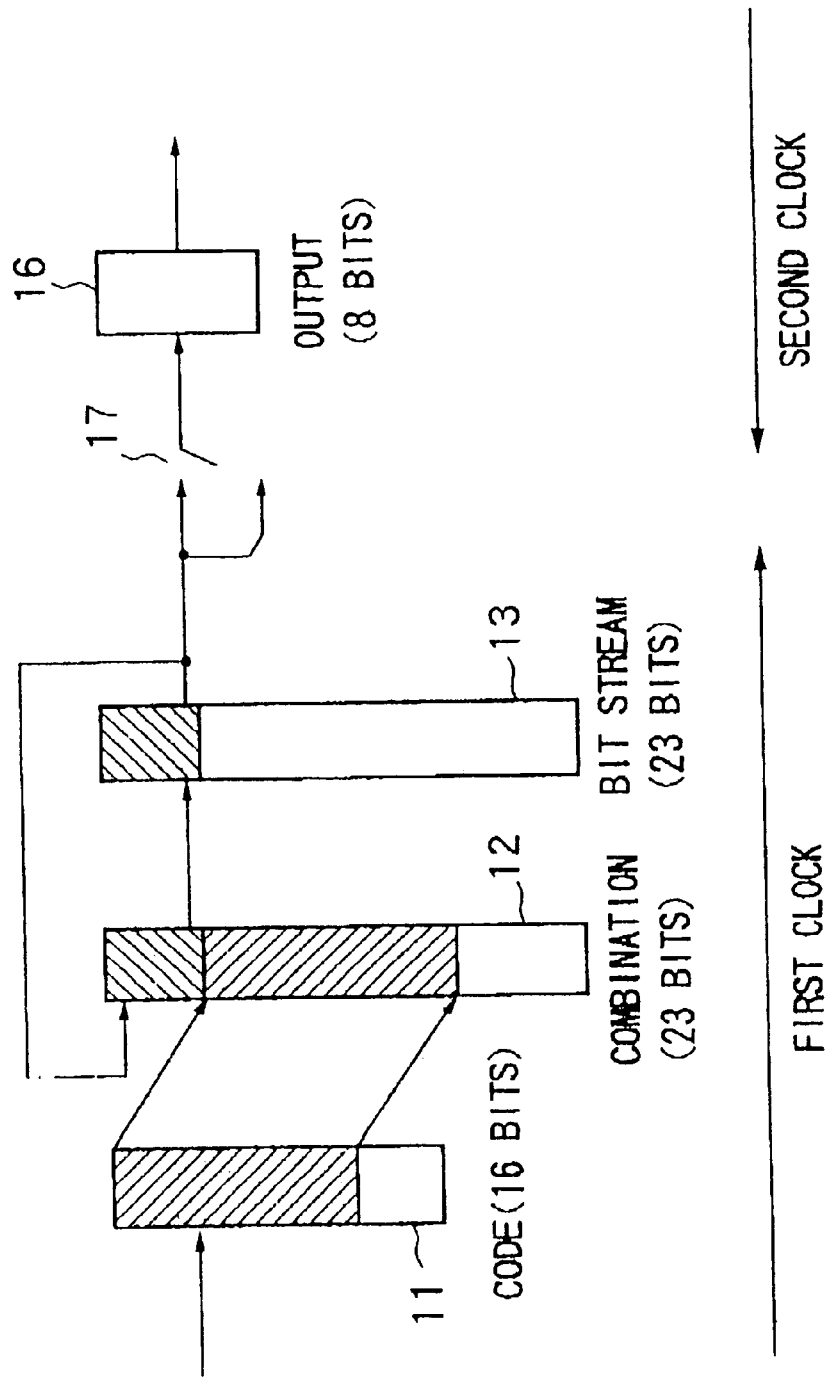
FIG. 3 is a view of a second specific example of the data stream conversion apparatus shown in FIG. 1 and the flow of its processing.

FIG. 3 is a view of the flow of processing in a second specific example of the data stream conversion apparatus 10.

The data stream conversion apparatus 10 shown in FIG. 3 is configured so that the combination portion 12 handles the maximum data length which may be combined and generated, is provided with a register of a size corresponding to the maximum data length which may be combined and generated as the bit stream holder 13, and transfers the variable length coded data newly input to the code holder 11 to the combination portion 12 in one cycle.

Further, the data is output in units of the data length of the output data, that is, 8 bits, in the same way as the above example, but when 16 bits of data corresponding to two sets of output data are generated by combination of data, this is output together. Therefore, after the bit stream holder 13, a switch 17 operating based on a second clock operating at a frequency of at least twice the first clock by which the bit stream holder 13 operates is provided and two sets of 8 bits of data stored in the bit stream holder 13 are successively selected in one cycle of the first clock.

Explaining the operation of the data stream conversion apparatus 10 in more detail, first, the maximum 16 bits of variable length coded data input to and held at the code holder 11 are transferred all together to the combination portion 12 and combined with the bits left over after output of the previously input variable length coded data, stored in the bit stream holder 13, 16 bits at a time.

The combined data is transferred to the bit stream holder 13. If 8 bits or more, 8 bits are output as output data. If 16 bits or more, 16 bits are output as two sets of output data.

That is, when outputting one set of 8 bits of data, the higher 8 bits of the data held in the bit stream holder 13 are selected by the switch 17 and output through the output register 16. Further, when outputting two sets of 8 bits of data, the higher 16 bits of the data. held in the bit stream holder 13 are selected in the order of the higher 8 bits and lower 8 bits by the switch 17 and are output through the output register 16 as two streams of serial data of 8 bits each.

Further, the data remaining after removal of the output 16 bits in the combined data stored in the bit stream holder 13 is output to the combination portion 12 to be combined with the next input variable length coded data.

After this, in the same way, the newly input variable length coded data and remaining data are combined at the combination portion 12 and held at the bit stream holder 13, then the higher 8 bits or 16 bits are output.

Note that the storage capacity of the bit stream holder 13 is the total 23 bits of the 7-bit maximum data length which can remain without being output at the bit stream holder 13 and the 16-bit maximum data length of the newly input variable length coded data.

Further, the code holder 11, the combination portion 12, and the bit stream holder 13 operate in synchronization with a first clock synchronized with the input side circuits, while the switch 17 and the output register 16 operate in synchronization with a second clock synchronized with the output side circuits. In particular, as explained above, as the second clock, use is made of a clock of a frequency of at least two times that of the first clock. By doing this, the switch 17 can convert the 16 bits of data held in the bit stream holder 13 to two sets of serial data of 8 bits each.

In this specific configuration, while the capacities of the combination portion 12 and the bit stream holder 13 become larger than those of the first specific example explained above, the data input to the code holder 11 is combined at the combination portion 12 and held in the bit stream holder 13 in one cycle, so it is possible to successively input data synchronized with the first clock without substantial waiting at the time of data input.

Second Embodiment

Next, a camera system for capturing a still image and recording it as a compressed and coded digital signal such as an electronic still camera will be explained as a second embodiment with reference to FIG. 4 to FIG. 13.

In the camera system of this embodiment, the compression and coding system used for the still image is the JPEG. In the JPEG, two systems of variable length data are generated as the coded data: the 2 to 16 bits of variable length coded data coded by variable length coding (sometimes simply referred to as "variable length codes") and the 0 to 11 bits of variable length added bit data (sometimes simply referred to as "added bits"). Further, the format of the JPEG data stream is that of the data corresponding to the two systems of variable length data successively packed to form streams of 8 bits of data.

Therefore, the data stream conversion apparatus used in the camera system of the present embodiment is configured to generate a data stream comprised of a stream of fixed length data from the successively input two systems of variable length data.

Figure 4:
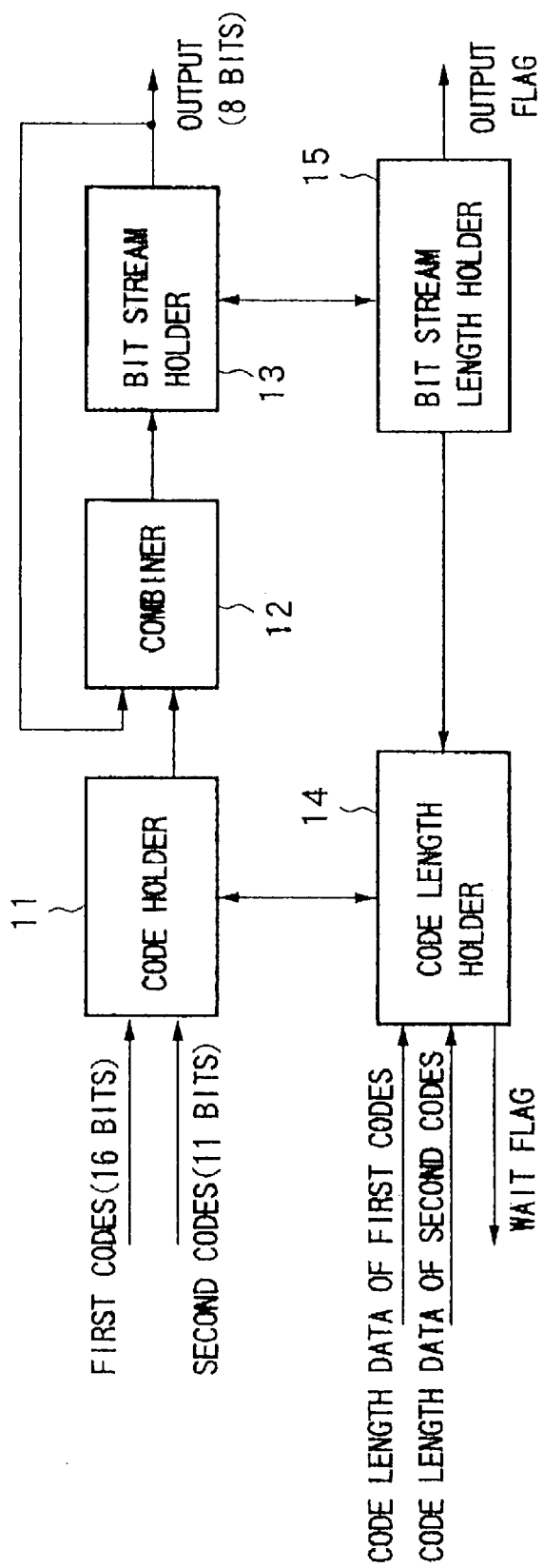
FIG. 4 is a view of the concept of the basic configuration of the data stream conversion apparatus according to a second embodiment of the present invention.

The concept of this basic configuration of a data stream conversion apparatus is shown in FIG. 4.

As shown in FIG. 4, the basic configuration is no different from the configuration of the data stream conversion apparatus 10 of the first embodiment shown in FIG. 1, but the variable length codes input to the code holder 11 are comprised of two systems, that is, the maximum 16 bits of first codes and maximum 11 bits of second codes. Further, the code length data input to the code length holder 14 is also comprised of two systems, that is, the first codes and second codes.

Therefore, the code holder 11 or combination portion 12 and the code length holder 14 have to perform processing for combining these two systems of data.

The inherent functions of the code holder 11 and combination portion 12 and the configurations, operations, forms of output signals, etc. of the bit stream holder 13 and the bit stream length holder 15 are the same as in the first embodiment explained above.

Next, the camera system of the present embodiment will be explained.

First, the configuration and operation of the camera system as a whole will be explained.

Figure 5:
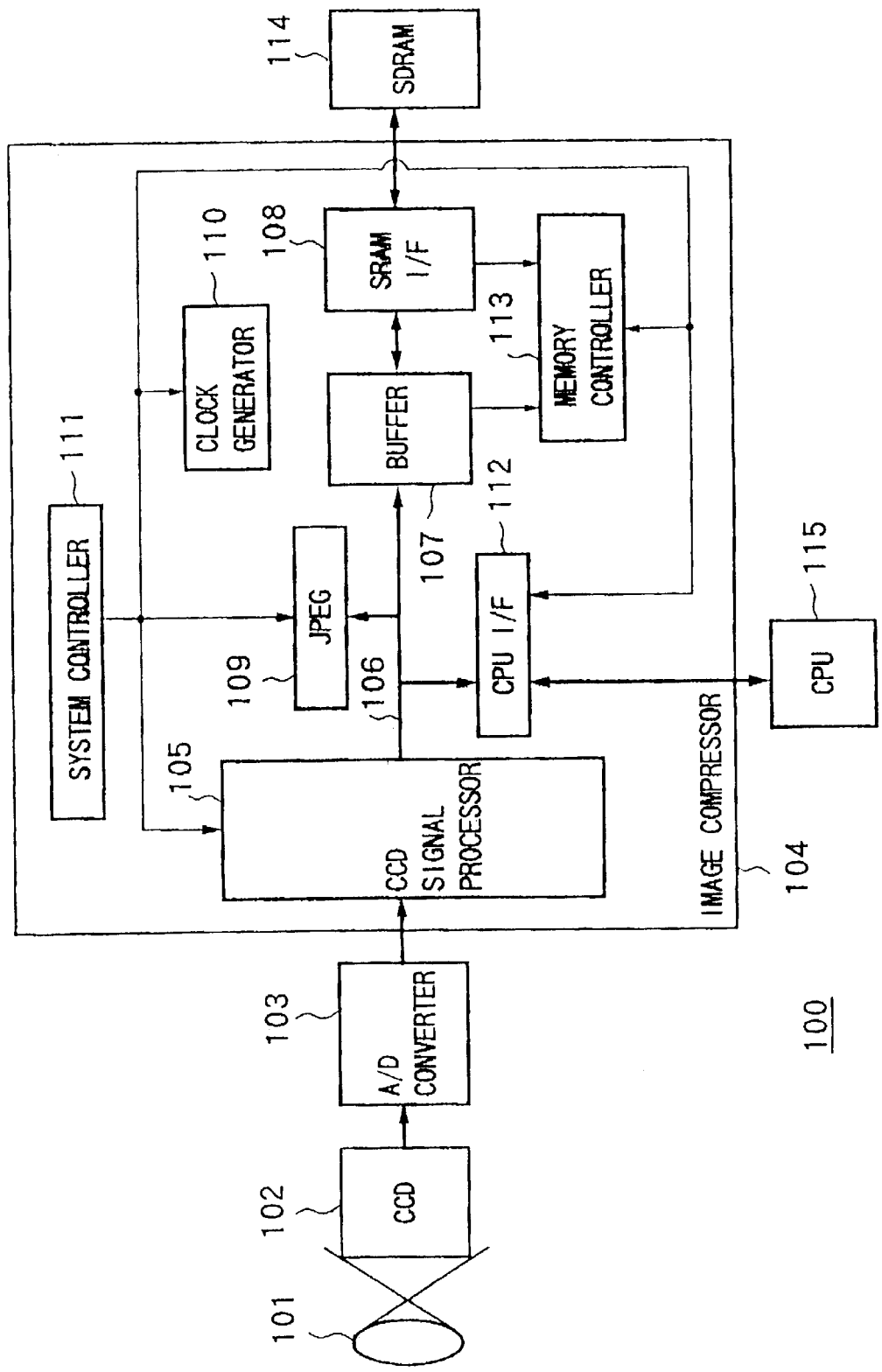
FIG. 5 is a block diagram of the overall configuration of a camera system of a second embodiment of the present invention.

FIG. 5 is a block diagram of the configuration of a camera system 100 of the present embodiment.

The camera system 100 is comprised of an optical system 101, a CCD 102, an A/D converter 103, an image compressor 104, a SDRAM 114, and a CPU 115.

Further, the image compressor 104 is comprised of a CCD signal processor 105, a bus 106, a buffer 107, a SDRAM interface (SDRAM I/F) 108, a JPEG processor 109, a clock generator 110, a system controller 11, a CPU interface (CPU I/F) 112, and a memory controller 113.

The optical system captures a desired image by operation by the user and focuses the optical signal on an image plane of the CCD 102.

The CCD 102 converts the optical signal on the image plane focused by the optical system 101 to an electrical signal and outputs it to the A/D converter 103 as an analog image signal.

The A/D converter 103 converts the analog image signal input from the CCD 102 to a digital signal of a predetermined halftone and outputs it to the CCD signal processor 105 of the image compressor 104.

The CCD signal processor 105 of the image compressor 104 splits the input digital image signal to color signals of R (red), G (green), and B (blue), performs gamma correction on the color signals for color reproduction, and generates a luminance signal and chrominance signal under the control of the system controller 111. The image signals comprised of the generated luminance signal and chrominance signal are output through a bus 106 to a buffer 107.

The buffer 107 successively stores the image signal input from the CCD signal processor 105 through the bus 106 until reaching a predetermined amount, then outputs it to the SDRAM I/F 108 under the control of the memory controller 113. Further, it temporarily stores the image data input from the SDRAM I/F 108 and read from the SDRAM 114 and outputs it through the bus 106 to the JPEG processor 109.

The SDRAM I/F 108 is an external memory of the image compressor 104 and stores in the SDRAM 114 image data for each predetermined unit input from the buffer 107 under the control of the memory controller 113. Further, it reads out the image data stored in the SDRAM 114 in units of 8×8 blocks and outputs it to the buffer 107.

The JPEG processor 109 codes by the JPEG format the image signal read from the SDRAM 114 and input through the buffer 107, generates a coded bit stream, and outputs it through the bus 106 and CPU I/F 112 to the CPU 115 under the control of the system controller 111. The configuration and operation of the JPEG processor 109 will be explained in detail later.

The clock generator 110 generates a clock used at the parts in the image compressor 104 and supplies it to the components under the control of the system controller 111.

The bus 106 schematically shows the data bus in the image compressor 104. Image data is transferred from the CCD signal processor 105 to the buffer 107 and from the buffer 107 to the JPEG processor 109, and the coded bit stream is transferred from the JPEG processor 109 to the CPU I/F 112 through this bus 106.

The system controller 111 operates under the control of the CPU 115 and controls the components of the image compressor 104 so that the operations of the image controller 104, that is, the storage of the input image data in the SDRAM 114, the transfer of the image data stored in the SDRAM 114 to the JPEG processor 109, the JPEG coding in the JPEG processor 109, and the output of the coded image data to the CPU 115, are suitably performed.

The CPU I/F 112 is an interface with the CPU 115 and receives as input control signals from the CPU 115 and image signals and outputs control signals to the CPU 115. and the coded data.

The memory controller 113 controls the buffer 107 and the SDRAM I/F 108 and controls the storage of the image data in the SDRAM 114, the reading of the image data stored in the SDRAM 114, etc. under the control of the system controller 111.

The SDRAM 114 is a memory for temporarily storing image data comprised of the captured luminance signal and chrominance signal. The image data captured by the optical system 101 to the A/D converter 103 is stored once in the SDRAM 114, then successively supplied to the JPEG processor 109, coded, output to the CPU 115, and used for storage, display, transmission, etc.

The CPU 115 controls the components of the camera system 100 so that the processing of the optical system 101 to image compressor 104 and SDRAM 114 such as the capture of the desired image, image processing, storage and reproduction of the image data, JPEG coding, and storage, display, and transmission of the JPEG coded data is suitably performed and so that the camera system 100 operates as desired as a whole.

In the camera system 100 of this configuration,. first, when a desired image is captured by the optical system 101 by operation of the user, the optical signal is converted to an electrical signal and an image signal is generated at the CCD 102. This image signal is converted from an analog signal to a digital signal at the A/D converter 103, is broken down into color signals at the CCD signal processor 105 of the image compressor 104, is gamma corrected, then is converted to an image signal comprised of a luminance signal and chrominance signal.

This image signal is stored once in the SDRAM 114 through the buffer 107 and SDRAM I/F 108, then is read out successively in 8×8 pixel blocks and input to the JPEG processor 109.

The JPEG processor 109 codes by the JPEG format the image data for each successively input block to generate a JPEG coded data stream of a predetermined format. This is output through the CPU I/F 112 to the CPU 115, stored, displayed, transmitted, etc.

Next, the configuration and operation of the JPEG processor 109 of the camera system 100 will be explained in further detail with reference to FIG. 6 to FIG. 12.

First, the detailed configuration and operation of the JPEG processor 109 will be explained with reference to FIG. 6 and FIG. 7.

Figure 6:
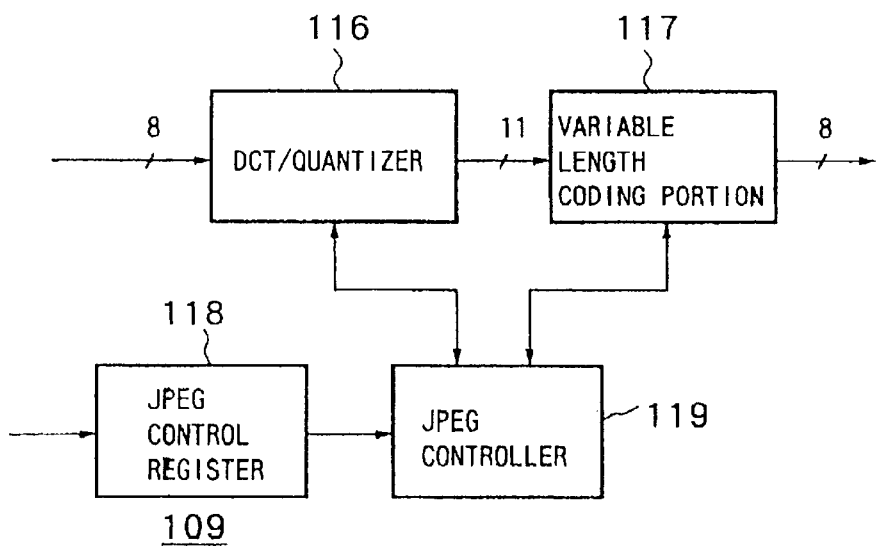
FIG. 6 is a block diagram of the configuration of a JPEG processor of the camera system shown in FIG. 5.

FIG. 6 is a block diagram of the configuration of the JPEG processor 109.

The JPEG processor 109 is comprised of a DCT/quantizer 116, a variable length coding portion 117, a JPEG control register 118, and a JPEG controller 119.

Note that the JPEG processor 109 is assumed to receive as input a 1-pixel 8-bit luminance signal or a 1-pixel 8-bit chrominance signal in 8×8 pixel units.

The DCT/quantizer 116 performs DCT on the 8×8 pixels worth of image data input, converts the data to 64 frequency components (DCT coefficients), and quantizes the coefficients using values corresponding to a not shown quantization table. The quantized DCT coefficients (11 bits) are output to the variable length coding portion 117.

The variable length coding portion 117 codes the DCT coefficients input from the DCT/quantizer 116 by variable length coding, converts the obtained variable length coded data and added bit data to an 8-bit unit bit stream, and outputs it from the JPEG processor 109.

Figure 7:
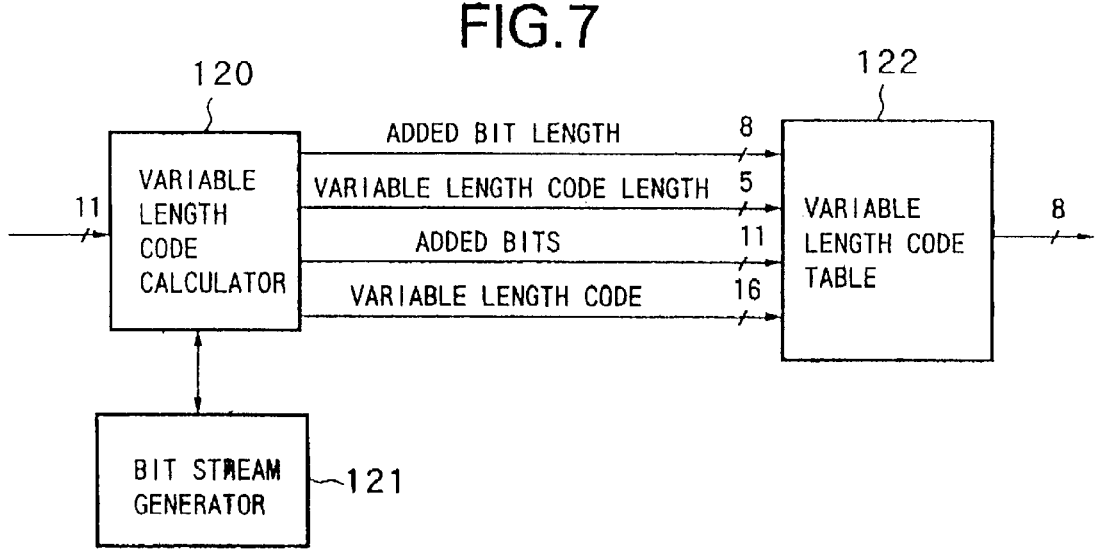
FIG. 7 is a block diagram of the configuration of the variable length coding portion of the JPEG processor shown in FIG. 6.

The configuration of the variable length coding portion 117 is shown in FIG. 7.

FIG. 7 is a block diagram of the configuration of the variable length coding portion 117.

The variable length coding portion 117 is comprised of a variable length code calculator 120, a variable length code table 121, and a bit stream generator 122.

The variable length code calculator 120 refers to the variable length code table 121 based on the quantized DCT coefficient input from the DCT/quantizer 116 to detect the variable length coded data corresponding to the magnitude of the DCT coefficient and the code length data of the variable length coded data. Further, it detects the added bit data from the magnitude of the DCT coefficient and the data length data of the added bit data. The detected variable length coded data, added bit data, variable length code length data, and added bit data length data are output to the bit stream generators 122.

Note that the variable length coded data is comprised of 2 to 16 bits of data, while the added bit data is comprised of 0 to 11 bits of data. Therefore, the data lengths are 5 bits and 4 bits.

The variable length code table 121 is a coding table for variable length coding.

The bit stream generator 122 converts the variable length data input from the variable length coding calculator 120, that is, the variable length coded data and the added bit data, to one stream of data of 8-bit data lengths by referring to the variable length coded data and added bit data length data input from the same variable length coding calculator 120 and outputs it as the coded bit stream.

The JPEG control register 118 of the JPEG processor 109 is a register set with data, parameters, etc. for control of the operation of the DCT/quantizer 116 and the variable length coding portion 117. It is set by the CPU 115 through the CPU I/F 112.

The JPEG controller 119 controls the DCT/quantizer 116 and the variable length coding portion 117 based on the data, parameters, etc. set in the JPEG control register 118 so that the DCT, quantization, variable length coding, bit stream generation, and other processing are suitably performed.

In the JPEG processor 109 of this configuration, operating conditions are set from the CPU 115 to the JPEG control register 118. Due to this, the JPEG controller 119 controls the DCT/quantizer 116 and variable length coding portion 117 for processing.

That is, the DCT/quantizer 116 perform DCT and quantization on the image data for each successively input 8×8 pixels.

The quantized DCT coefficients are coded by variable length coding in the variable length coding calculator 120 of the variable length coding portion 117 to generate the variable length coded data and added bit data.

Further, the variable length data, that is, the variable length coded data and the added bit data, is converted in the bit stream generator 122 to a stream of fixed length data of 8-bit data lengths and output as a JPEG coded data stream.

Next, the configuration and operation of the bit stream generator 122 of the variable length coding portion 117 according to the present invention in this JPEG processor 109 will be explained in further detail.

Figure 8:
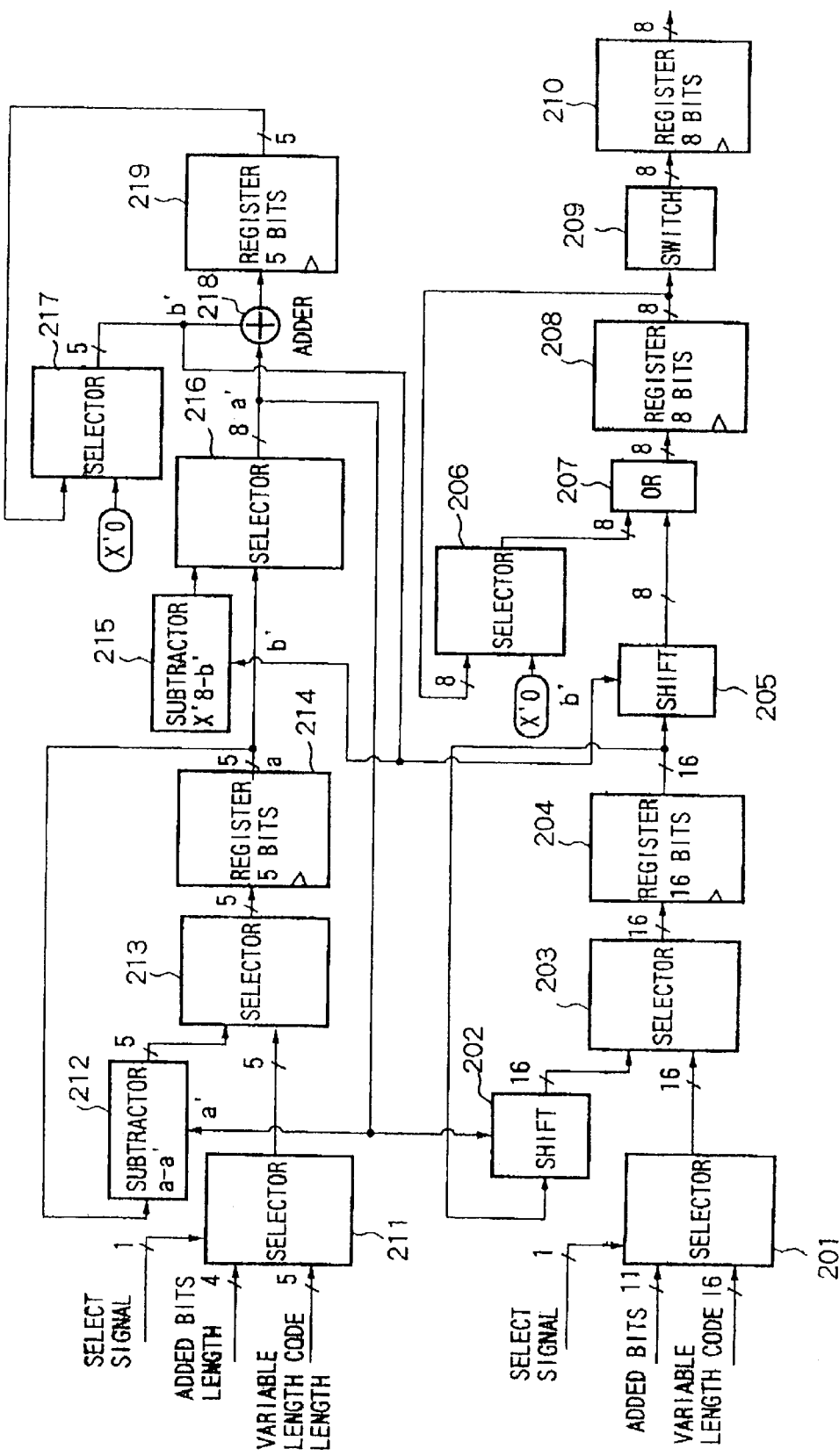
FIG. 8 is a view of the circuit configuration of the bit stream generator shown in FIG. 7.

FIG. 8 is a view of the circuit configuration of the bit stream generator 122.

First, the configuration of the bit stream generator 122 will be explained.

A selector 201 selects one of the variable length coded data or added bit data applied to the bit stream generator 122 in accordance with a select signal input from the outside and outputs it to a selector 203. As explained with reference to FIG. 7, the variable length coded data and the added bit data are generated in a pair at the variable length coding calculator 120 of the variable length coding portion 117 and supplied to the bit stream generator 122. Therefore, the selector 201 alternately selects the variable length coded data and added bit data for each operating cycle in the manner of first selecting the variable length coded data and then selecting the added bit data and outputs it to the selector 203.

The selector 203 selects one of the data input from the later mentioned shift circuit 202 or the data selected and input from the selector 201 and outputs it to the register 204.

The selector 203 selects the output of the shift register 202 when the condition a+b'>8 stands and selects the output of the sector 201 when it does not stand. This is because when the condition a+b'>8 stands, that is, when the sum of the data lengths of the data stored in the register 204 and the data before bit stream conversion stored in the register 208 is over 8 bits, the transfer of the data from the register 204 to the later stage cannot be completed in one cycle. That is, several bits of the data stored in the register 204 remain in the register 204. Therefore, in this case, the selector 203 selects the output of the shift circuit 202 and stores the data of the remaining bits shifted to the MSB side in the register 204 again.

Note that the "data before bit stream conversion stored in the register 208" is the data stored in the register 208 with a data length not reaching the data of a bit stream, that is, 8 bits.

When the data stored in the register 208 is 8 bits, this forms one set of data converted to a bit stream. Therefore, in this case, the data length b of the data stored in the register 208 is 8 bits, but the data length of the previous data converted to a bit stream stored in the register 208 becomes zero.

The register 204 is a register for holding the input data to be converted to a bit stream and holds the data selected at the selector 203. Normally, the register 204 stores the variable length coded data and added bit data selected by the selector 201 and selector 203 and newly input from the outside and outputs them to the later shift circuit 205 on. As explained above, however, when a+b'>8, that is, when the sum of the data lengths of the data stored in the register 204 and the data before bit stream conversion stored in the register 208 exceeds 8 bits, the data transferred from the register 204 to the later stage becomes only the data for filling the shortage not reaching 8 bits. Therefore, in this case, the register 204 stores the data of the output of the shift circuit 202 selected by the selector 203 shifted to the MSB side.

The shift circuit 202 shifts the values of the register 204 to the MSB side by the amount of the data length a' of the data transferred from the register 204 to the later stage and outputs the data resulting from the shift to the selector 203.

The shift circuit 205 shifts the data output from the register 204 to the LSB side by the amount of the data length b' of the data before bit stream conversion already stored in the register 208.

The selector 206 selects x'0 (x' indicating a hexadecimal notation) when the condition b=8 stands, that is, when the data length of the data stored in the register 208 is 8, and selects the value of the register 208 when it does not stand and outputs it to the OR circuit 207. If the data length b=8 of the data stored in the register 208 is 8, the data stored in the register 208 is output to the register 210 as one set of bit stream converted data and no longer has to be stored in the register 206. On the other hand, if the data length b of the data stored in the register 208 is not 8, that is if b<8, the data stored in the register 208 still cannot be output, so is selected by the sector 206 and combined with new data in the later OR circuit 207.

The OR circuit 207 calculates the logical OR (OR) of each bit of the data output from the register shift circuit 205 with the 8 bits of data output from the selector 206 and outputs the result to the register 208.

As explained above, when data of less than 8 bits is stored in the register 208, this is selected by the selector 206 and the data shifted to the LSB side by the amount of the data length b' of that data by the shift circuit 205 is input to the OR circuit 207. The OR circuit 207 combines these data by obtaining the OR values for them and stores the result in the register 208.

When no data is stored in the register 208 or when data of 8 bits is stored, no data before bit stream conversion is stored at all, so 0 is selected by the selector 206 and the data stored in the register 204 is input as it is without any shift by the shift circuit 205 to the OR circuit 207. As a result, no operation at all is performed at the OR circuit 207 and the data is stored in the register 208. In this case, the data stored in the register 204 is stored in the register 208 through the shift circuit 205 and the OR circuit 207.

The register 208 is a register for holding the bit stream data and holds the data input from the OR register 207. Further, when the valid data length b of the data stored in the register 208 becomes 8 bits, the data is output through the switch 209 to the register 210 as one set of bit stream converted data. The data not reaching 8 bits stored in the register 206 is stored again in the register 208 through the selector 206 and the OR circuit 207.

When the value of the valid bit data length b of the register 208 stored in the register 219 reaches 8, that is, when one set of 8 bits of data has been assembled, the switch 209 outputs this as output data to the register 210.

The register 210 is a register for storing bit stream data of 8 bits each input through the switch 209.

The selector 211 selects the variable length coded data or added bit length data and outputs it to the selector 213 in accordance with a select signal input corresponding to the selection of the input data at the selector 201.

The selector 213 selects the value of the later-mentioned subtractor circuit 212 when the condition a+b'>8 stands and selects the value selected at the selector 211 when it does not stand and outputs it to the register 214.

This is because when the condition a+b'>8 stands, that is, when the sum of the data lengths of the data stored in the register 204 and the data before bit stream conversion stored in the register 208 is over 8 bits, the transfer of the data from the register 204 to the later stage cannot be completed in one cycle. That is, the data length a' of the data transferred from the register 204 to the later stage becomes smaller than the data length a of the data stored in the register 204 and several bits of the data stored in the register 204 (a−b' bits) remain in the register 204. Therefore, in this case, the selector 213 selects the value of the subtractor circuit 212 and stores the data length of the remaining data in the register 214.

When the condition a+b'≦8, the data stored in the register 204 is transferred to the later stage together in the next cycle and newly input data is stored in the register 204, so the selector 213 may select the data length of the newly input data selected by the selector 211 and store it in the register 214.

The register 214 is a register for holding the valid data length a of the data to be converted to a bit stream held in the register 204.

The subtractor circuit 212 is a subtractor circuit which subtracts the data length a' of the data transferred from the register 204 to the later stage from the value a of the data length of the data stored in the register 204 stored in the register 214 so as to calculate the data length of the data remaining in the register 204. As explained above, when a+b'>8, the value becomes other than 0 and is selected by the selector 213 and stored in the register 214.

The selector 216 is a selector which selects the data length of the data newly transferred to the register 208. It selects the value of the subtractor circuit 215 when the condition a+b'>8 stands and selects the value of the register 214 when it does not stand.

That is, when the sum of the data lengths of the data stored in the register 204 and the data before bit stream conversion stored in the register 208 exceeds 8 bits, it selects the data length calculated at the subtractor circuit 215 so that the data length of the data stored in the register 208 becomes 8 bits, while when the sum of the data lengths does not exceed 8 bits, it selects the data length of the data stored in the register 204 stored in the register 214 as it is.

Due to this, when the sum of the data lengths exceeds 8 bits, data of part of the data stored in the register 204 is transferred through the shift circuit 205 and the OR circuit 207 to the register 208, while when the data lengths do not exceed 8 bits, all of the data stored in the register 204 is transferred.

The subtractor circuit 215, as explained above, is a circuit for calculating the amount of transferred data when not transferring all of the data of the register 204. It subtracts the output of the selector 217, that is, the data length b' of the data before bit stream conversion of the data stored in the register 208, from x'8 and outputs the result of subtraction to the selector 216.

The adder circuit 218 adds the data length b' of the remaining data not output as bit stream data in the data stored in the register 208 selected by the selector 217 and the data length a' of the newly transferred data selected by the selector 216 to find the data length of the data newly stored in the register 208 and stores it in the register 219.

The register 219 stores the result of addition of the adder circuit 218, that is, the data length of the data stored in the register 208 updated every operating cycle.

The selector 217 selects x'0 when the condition b=8 stands, that is, when the data length of the data stored in the register 208 is 8, and selects the value of the register 219 when it does not stand and outputs it to the adder circuit 218. Due to this, it generates the data length b' of the data not converted to a bit stream stored in the register 208 from the data length b of the data stored in the register 208.

The bit stream generator 122 of this configuration receives the variable length coded data of 2- to 16-bit lengths, added bit data of 0- to 11-bit lengths, the 5-bit variable length code length data, the 4-bit added bit length data, and the five sets of data of the select signals and outputs a bit stream of 8-bit lengths. Therefore, the input coded data, when longest, becomes 27 bits when combining the 16 bits of the variable length code and 11 bits of the added bit data. Since the output is of 8-bit lengths, to output the 27 bits of data in 8-bit units, it is necessary to output the data at a speed of about 4 times the data input speed (27/8=3.375). Therefore, as the clock, a first clock CLK1 for data input and a second clock CLK2 for data output of a frequency four times the first clock CLK1 are used.

Next, the detailed operation of the bit stream generator 122 of this configuration will be explained.

First, the operation of the bit stream generator 122 when no valid data is stored in the register 208, that is, when the data of the register 119 is 0, and 16 bits of variable length coded data and 11 bits of added bit data are input will be explained with reference to FIG. 9 and FIG. 10.

Figure 9:
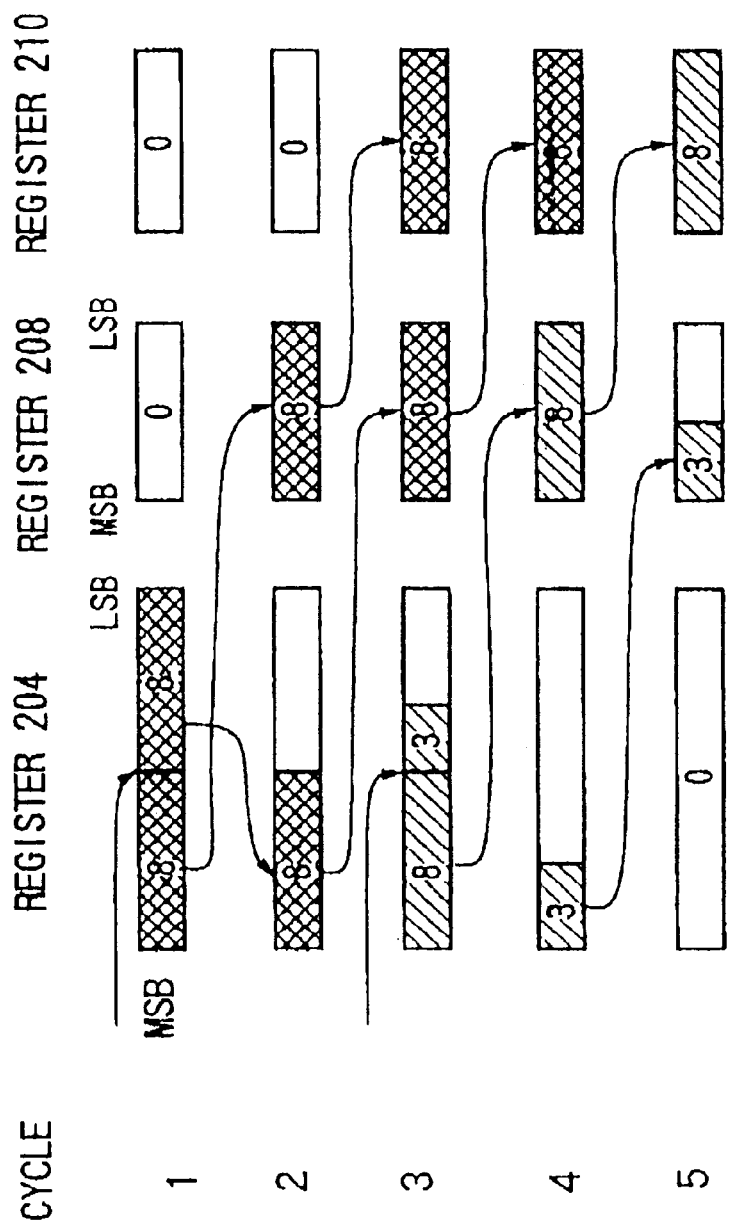
FIG. 9 is a view of the flow of the data among the main registers in a first specific example of the operation of the bit stream generator shown in FIG. 8.

FIG. 9 is a view of the flow of the data among the main registers of the bit stream generator 122 in this case.

First, at the cycle 1, the 16 bits of the variable length coded data are input through the selector 201 and the selector 203 to the register 204.

Next, in at the cycle 2, the 8 bits of the MSB side of the register 204 are transferred through the shift circuit 205 and the OR circuit 207, while the 8 bits of the LSB side of the register 204 are shifted through the shift circuit 202 and the selector 203 to the MSB side of the register 204.

At this time, since 8 bits of data still remain in the register 104, the next data cannot be input.

Next, at the cycle 3, the data of the register 208 is transferred to the output stage register 210, the remaining 8 bits of data stored in the register 204 are transferred to the register 208, and new data, that is, the 11 bits of the added bit data, are stored in the register 204.

At the cycle 4, the remaining 8 bits of data of the variable length coded data stored in the register 208 are transferred to the output stage register 210, the higher 8 bits of data of the added bit data stored in the register 204 are transferred to the register 208, and the remaining 3 bits of the LSB side of the register 204 are shifted to the MSB side of the register 204. At this time, 3 bits of data still remain at the register 104, so the next data cannot be input.

Further, at the cycle 5, the higher 8 bits of data of the added bit data stored in the register 208 are transferred to the output stage register 210 and the remaining 3 bits of data of the added bit data stored in the register 204 are transferred to the register 208.

In this way, the bit stream generator 122 can process the 27 bits of data of the 16 bits of variable length coded data and 11 bits of added bit data into a bit stream in four clocks of the first clock CLK1 (4 cycles).

Figure 10:
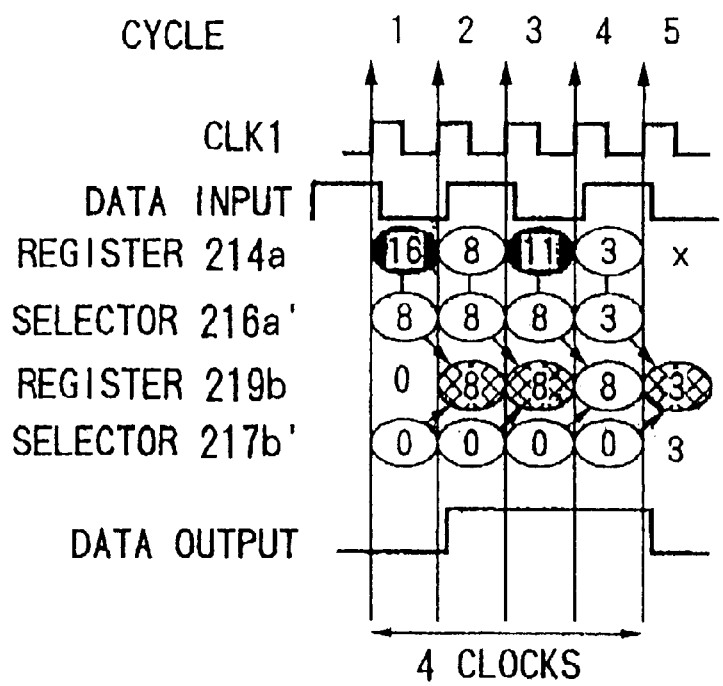
FIG. 10 is a view of the operation of the components relating to the control of the data length in a first specific example of the operation of the bit stream generator shown in FIG. 8.

The state of operation of the main registers and selectors of the data length control circuit performed by the selector 211 to register 219 during this processing is shown in FIG. 10.

Next, the operation of the bit stream generator 122 when, as an initial condition, 7 bits of data before bit stream conversion are stored in the register 208, and 16 bits of variable length coded data and 11 bits of added bit data are input will be explained with reference to FIG. 11 and FIG. 12.

Figure 11:
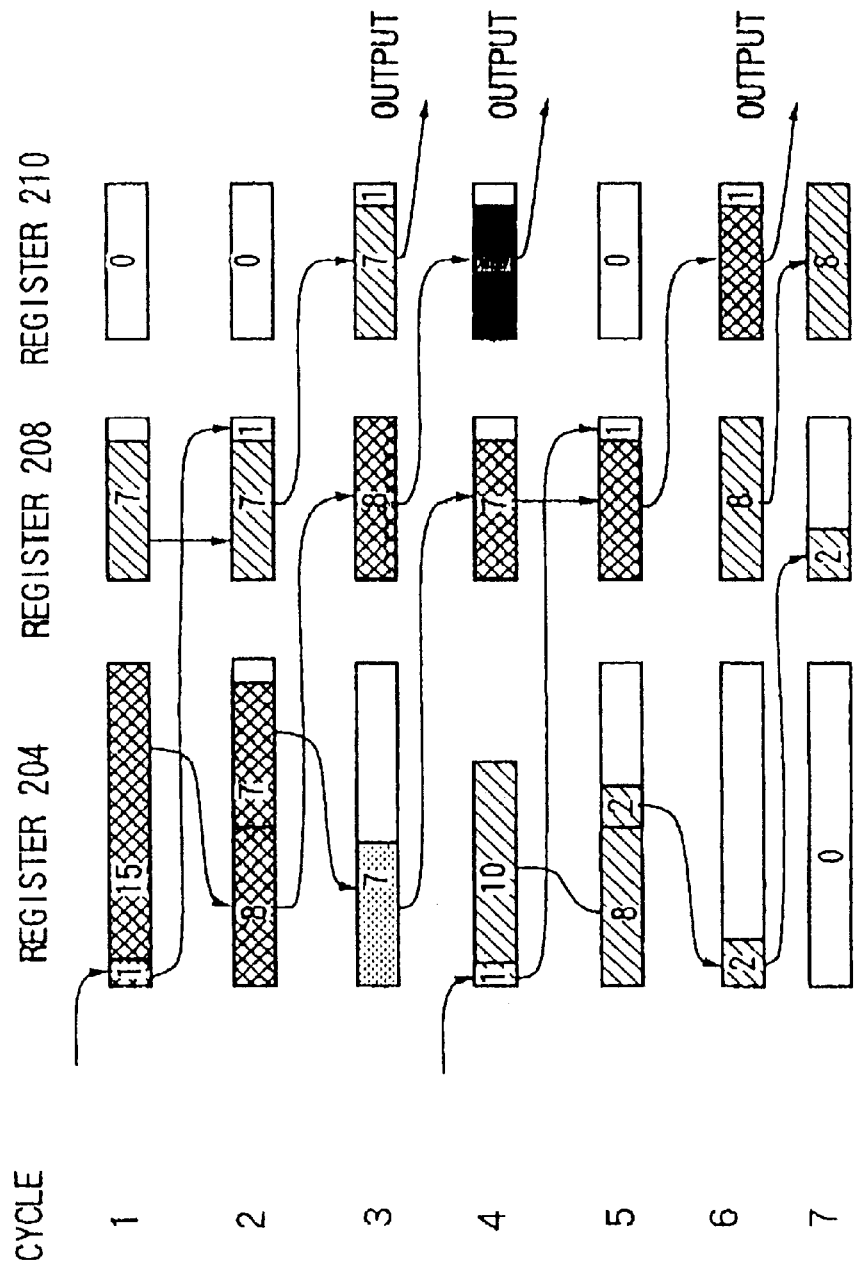
FIG. 11 is a view of the flow of the data among the main registers in a second specific example of the operation of the bit stream generator shown in FIG. 8.

FIG. 11 is a view of the flow of data among the main registers of the bit stream generator 122 in this case.

First, at the cycle 1, the 16 bits of the variable length coded data are stored through the selector 201 and the selector 203 in the register 204. Due to this, the amount of the data stored in the register 204 becomes 16 bits.

Next, at the cycle 2, 1 bit of data of the MSB side of the register 204 is combined with 7 bits of data stored in the register 208. At this time, the 1 bit of data is shifted to the LSB side by 7 bits by the shift circuit 205 and OR'ed with the 7 bits of data stored in the register 208 earlier by the OR circuit 207.

Further, at this time, since a+b'>8 is satisfied, the data stored in the register 204 is shifted 1 bit to the MSB side by the shift circuit 202, then stored in the register 204.

At the cycle 3, the data of the register 208 is transferred to the output stage register 210 and 8 bits of data of the MSB side stored in the register 204 are transferred to the register 208. Further, the remaining 7 bits of the LSB side of the register 204 are shifted to the MSB side of the register 204. At this time, 7 bits of data still remain in the register 104, so the next data cannot be input.

At the cycle 4, the 8 bits of data stored in the register 208 are transferred to the output stage register 210 and the remaining 7 bits of data of the variable length coded data stored in the register 204 are transferred to the register 208. Further, the new data, that is, the 11 bits of the added bit data, are stored in the register 204.

At the cycle 5, the data stored in the register 208 consists of 7 bits, so is not output to the register 210. The most significant 1 bit of the data stored in the register 204 is shifted by the shift circuit 205 and combined with the 7 bits of data stored in the register 208 to generate 8 bits of data which are then stored in the register 208. Due to this, the remaining 10 bits of data of the register 204 are shifted to the MSB side.

At the cycle 6, the 8 bits of data of the register 208 combined previously are output to the register 210, while the higher 8 bits of the data stored in the register 204 are transferred to the register 208. Further, the remaining 2 bits of data of the register 204 are shifted to the MSB side.

Further, at the cycle 7, the 8 bits of data of the register 208 are output to the register 210, while the remaining 2 bits stored in the register 204 are transferred to the register 208.

In this way, the bit stream generator 122 can process the 34 bits of data of the 7 bits of data remaining in the register 208, the 16 bits of variable length coded data, and the 11 bits of added bit data into a bit stream in seven clocks (7 cycles) of the first clock CLK1.

Figure 12:
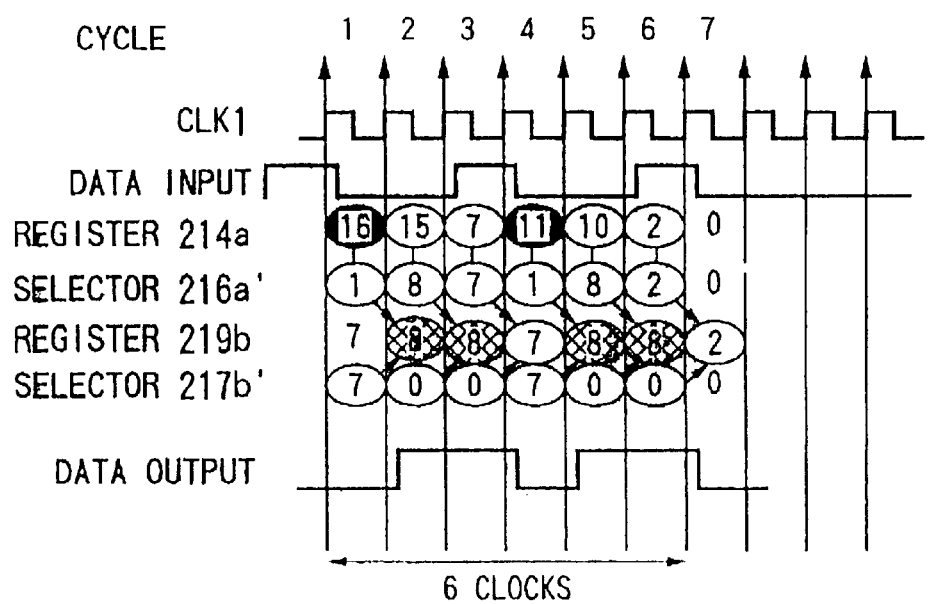
FIG. 12 is a view of the operation of the components relating to the control of the data length in a second specific example of the operation of the bit stream generator shown in FIG. 8.

The states of operation of the main registers and selectors of the data length control circuit performed by the selector 211 to register 219 during this processing are shown in FIG. 12.

Figure 13:
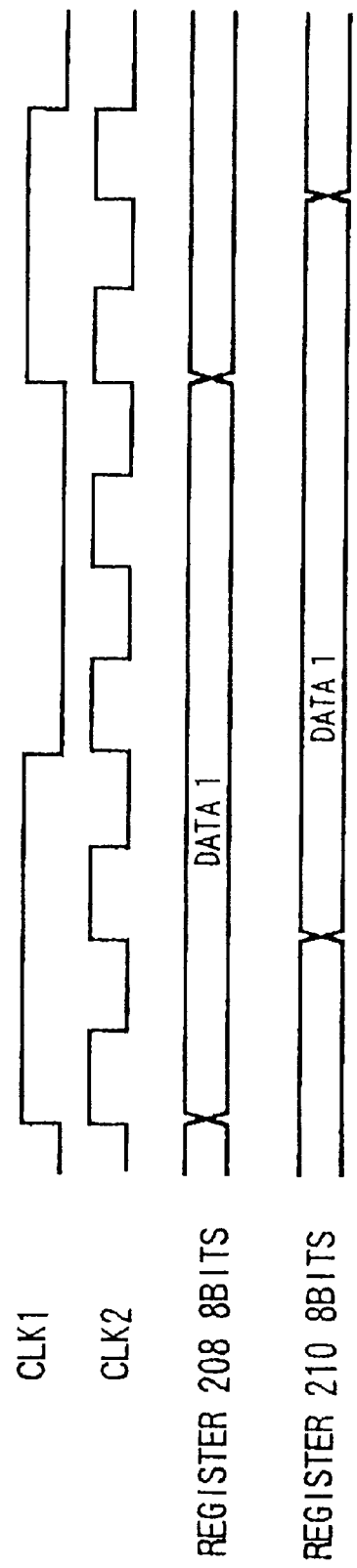
FIG. 13 is a time chart of the data output of the bit stream generator shown in FIG. 8.

Finally, the time chart at the time of output of data of the bit stream generator 122 is shown in FIG. 13.

The register 208 holds data starting in synchronization with the first clock CLK1, while the output register holds data starting in synchronization with the second clock CLK2.

Third Embodiment

The bit stream generator 122 of the above second embodiment cannot simultaneously process variable length coded data and added bit data into a bit stream, so has to convert one to a bit stream, then convert the other to a bit stream.

Further, the register 208 can only hold 8 bits of data in one cycle of the first clock CLK1, so as explained with reference to FIG. 13, despite the fact that the output register 210 can output 32 bits of data corresponding to four cycles of the second clock CLK2 in one cycle of the first clock CLK1, it can only output the 8 bits held by the register 208.

Therefore, to convert the longest code of the JPEG format, that is, the set of 16 bits of variable length coded data and the 11 bits of added bit data, to a bit stream, even when the output clock was made four times the input clock, four clocks of the input clock were necessary at the minimum. During this time, the next variable length coded data and added bit data could not be converted to a bit stream. Therefore, to code one block of an image of the JPEG format (64 bits of data), a minimum of 256 clocks were required.

A bit stream generator which deals with this problem and generates a JPEG data stream more efficiently will be explained as a third embodiment of the present invention with reference to FIG. 15 to FIG. 20.

The bit stream generator 122b shown in the third embodiment, in the same way as the second embodiment, is a component provided in the variable length coding portion 117 of the JPEG processor 109 of the camera system 100. The concept of the basic configuration of the data stream conversion apparatus explained with reference to FIG. 4 to FIG. 7 and the configuration and operation of the camera system 100, JPEG processor 109, and variable length coding portion 117 are the same as in the second embodiment, so explanations thereof will be omitted.

First, the flow of processing of the bit stream generator 122b according to this embodiment will be explained with reference to FIG. 14.

Figure 14:
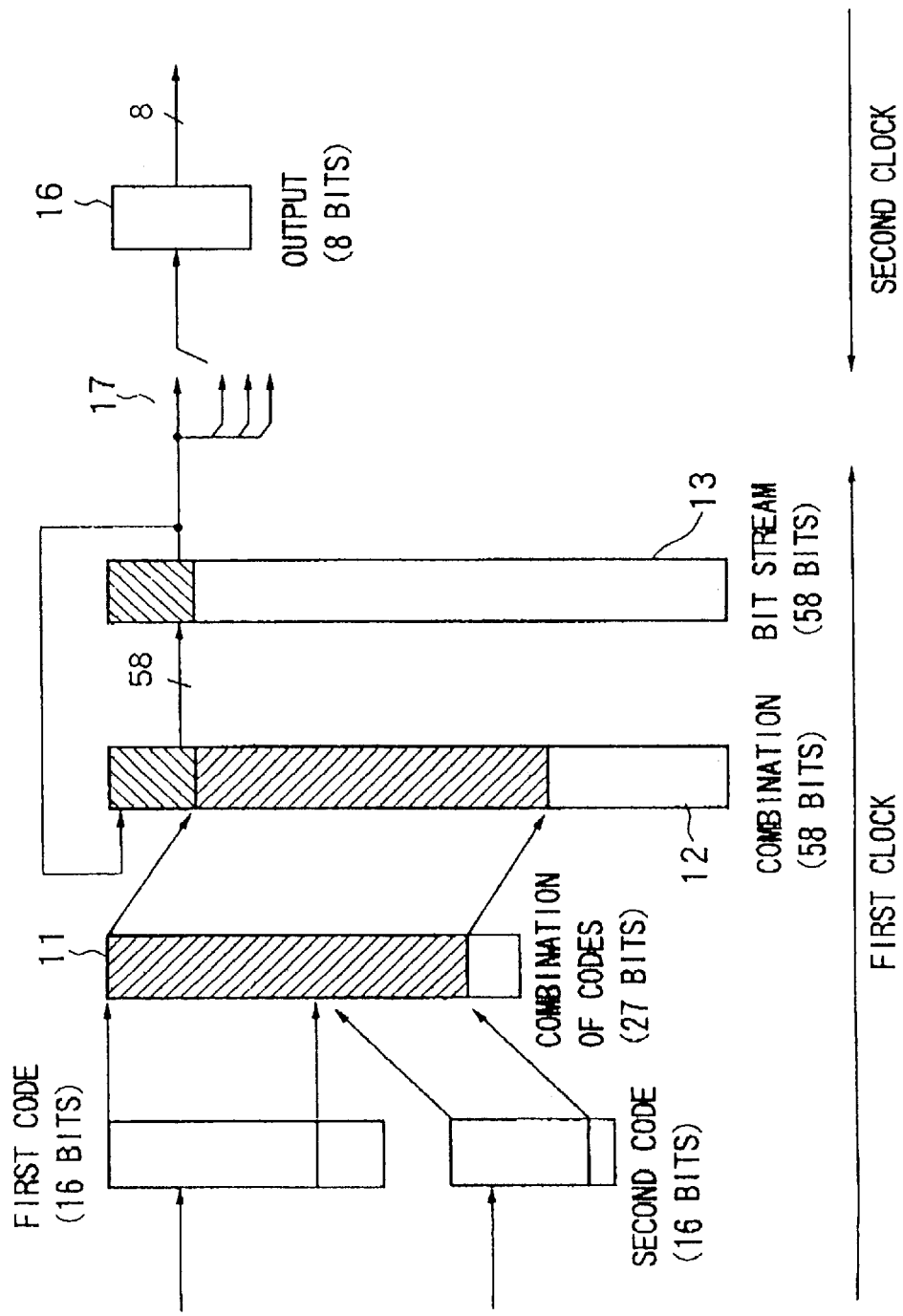
FIG. 14 is a view of the concept of the basic configuration of the data stream conversion apparatus according to a third embodiment of the present invention.

As shown in FIG. 14, the bit stream generator 122b first combines first codes corresponding to the input maximum 16 bits of variable length coded data and second codes corresponding to the maximum 11 bits of added bit data at the code holder 11 to obtain input variable length data of a maximum 27-bit length and then performs the next processing.

Next, the combination portion 12 is provided with a register of a size corresponding to the maximum data length which can be combined and generated as the bit stream holder 13 as a configuration for dealing with the maximum data length which can be combined and generated and transfers the variable length coded data newly input to the code holder 11 to the combination portion 12 in one cycle.

The data is output in units of 32 bits corresponding to four sets of output data. This is output together as four sets of 8 bits of data in one input cycle. For this purpose, provision is made, after the bit stream generator 13, of a switch 17 operating based on a second clock of a frequency of at least four times the first clock by which the bit stream holder 13 operates and the four sets of 8 bits of data stored in the bit stream holder 13 are successively selected in one cycle of the first clock.

Explaining the operation of the bit stream generator 12 more specifically, first, the two systems of input variable length data of the maximum 16 bits and 11 bits input to the bit stream generator 122b are combined at the code holder 11 to a maximum 27 bits of variable length data and transferred all together to the combination portion 12 where the variable length coded data input up to then and stored in the bit stream holder 13 is combined with the remaining bits output 16 bits at a time.

The combined data is transferred to the bit stream holder 13. If more than 32 bits, 32 bits are output as four sets of output data.

That is, the higher 32 bits of data of the data held in the bit stream holder 13 are successively selected 8 bits at a time from the top by the switch 17 and output as a string of four sets of serial data of 8 bits each through the output register 16.

Further, the data remaining after the output of 32 bits in the combined data stored in the bit stream holder 13 is output to the combination portion 12 to be combined with the next input variable length coded data.

In the same way, after this, the newly input variable length code data and remaining data are combined in the combination portion 12, the result is held in the bit stream holder 13, then the higher 32 bits are output.

Note that the storage capacity of the bit stream holder 13 becomes the total 58 bits of the 31-bit maximum data length of the data which can remain without being output in the bit stream holder 13 and the 27-bit maximum data length of the newly input variable length coded data.

Further, the code holder 11, the combination portion 12, and the bit stream holder 13 operate in synchronization with the first clock synchronized with the input side circuits, while the switch 17 and the output register 16 operate in synchronization with the second clock synchronized with the output side circuits. In particular, as explained earlier, the second clock is a clock of a frequency of at least four times the first clock. By using this, the switch 17 can convert the 32 bits of data held in the bit stream holder 13 to four sets of serial data of 8 bits each.

Next, the specific configuration and operation of the bit stream generator 122b will be explained with reference to FIG. 15 to FIG. 20.

Figure 15:
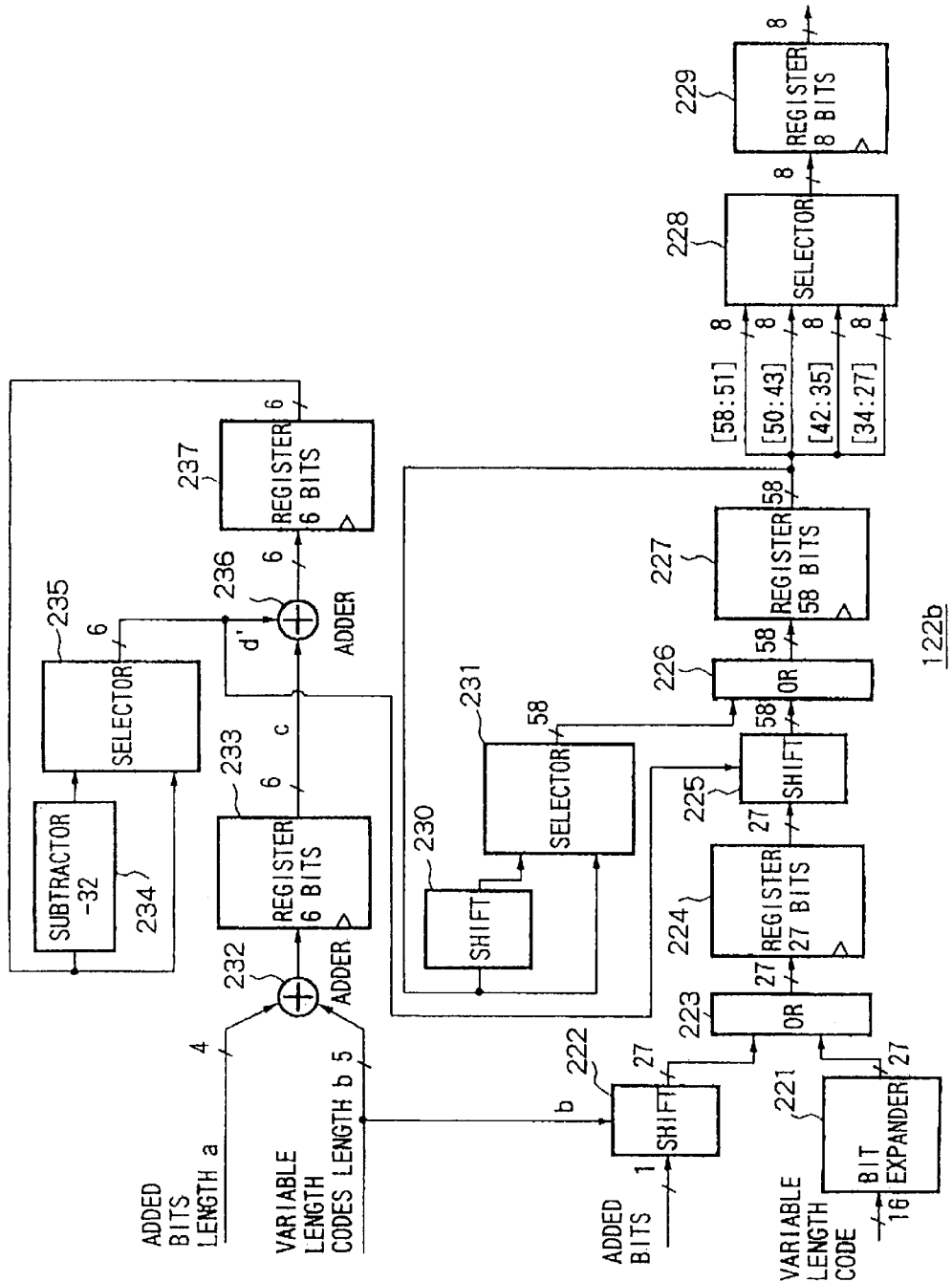
FIG. 15 is a view of the circuit configuration of a bit stream generator of a third embodiment of the present invention.

FIG. 15 is a view of the specific circuit configuration of the bit stream generator 122b of the third embodiment.

The register 233 holds the valid data length c of the data for bit stream conversion stored in the register 224.

The register 227 holds the bit stream data.

The register 237 holds the valid data length d of the bit stream data stored in the register 227.

The output register 229 holds the bit stream data formed in 8-bit units.

Further the variable length coded data length is designated as "a" and the added bit data length is designated as "b".

The valid data length of the register 227 before conversion of the data of the register 224 to a bit stream is designated as "d'".

The bit expansion circuit 221 expands the input maximum 16 bits of variable length coded data to 27 bits of data so that the valid data is arranged from the MSB side and bits "0" are added to the LSB side and outputs this to the OR circuit 223.

The shift circuit 222 shifts the input maximum 11 bits of added bit data to the LSB side by the amount of the variable length coded data length "b" while filling "0" at the MSB side and outputs the result as 27 bits of data to the OR circuit 223.

The OR circuit 223 combines the data output from the bit expansion circuit 221 and the data output from the shift circuit 222 by obtaining a logical OR (OR) for the corresponding bits and outputs the result of the combination to the register 224 as data to be converted to a bit stream.

The register 224 holds the data to be converted to a bit stream output from the OR circuit 223.

The shift circuit 225 shifts the data to be converted to a bit stream held in the register 224 to the LSB side by the amount of the valid data length "d'" bits of the data before bit stream conversion stored in the register 227 and outputs the result to the OR circuit 226.

The shift circuit 230 shifts the data held in the register 227 to the MSB side by 32 bits and outputs the result to the selector 31. The shift circuit 230 is a circuit for shifting the remaining bits to the MSB side when 32 bits of the bit stream data are output from the register 227. Therefore, the output of the shift circuit 230 is selected by the selector 231 and becomes valid when data is output from the register 227.

The selector 231 selects the output data of the shift circuit 230 when the condition d≧32 stands. For example, it selects the data held in the register 227 and outputs the selected data to the OR circuit 226. When d≧32, that is, when 32 or more bits of data are stored in the register 227, the higher 32 bits of data stored in the register 227 are output as four sets of bit stream data. Therefore, in this case, the selector 231, as mentioned above, selects the data obtained by shifting the remaining bits of the register 227 to the MSB side by the shift circuit 230, combines it with the new data, and resets it in the register 227.

Further, when 32 bits of data are not stored in the register 227, the data is not output, but is held as it is to be combined with the new data, so the selector 31 selects the data of the register 227 as it is.

The OR circuit 226 combines the output data of the shift circuit 225 and the output data of the selector 231 by obtaining the logical OR for corresponding bits and outputs the combined result to the register 227. Due to this, the new input data is combined with the data before bit stream conversion stored in the register 227, that is, the data not reaching 32 bits.

The register 227 holds the output data of the OR circuit 226 as bit stream data.

Note that the "data before bit stream conversion stored in the register 227 (data length d')" is the data stored in the register 208 when the data length does not reach the unit of output from the register 227, that is, four bit streams worth of data, that is, 32 bits.

When the data stored in the register 227 (data length d) includes 32 or more bits, the higher 32 bits of data are made data converted to a bit stream. Therefore, in this case, the data length d' of the data before bit stream conversion stored in the register 227 becomes d−32 bits with respect to the data length d of the data stored in the register 227.

The selector 228 selects the 32 bits at the MSB side of the data of the register 227 successively in 8-bit units from the MSB side and outputs it to the output register 229 when the condition b≧32 stands, that is, when the valid data length d of the bit stream data stored in the register 227 is 32 bits or more.

The output register 229 holds the data of the 8-bit units selected by the selector 228 and successively input and successively outputs it as the generated JPEG data stream.

The selector 228 and the output register 229 operate by a second clock CLK2 of a frequency four times that of the first clock CLK1. Therefore, during one cycle where data is held in the register 227, the 32 bits of data of the MSB side are selected and output as four sets of data of 8 bits each.

The adder circuit 232 adds the input variable length coded data length b and the added bit data length a, calculates the total bit length of the simultaneously input set of variable length coded data and added bit data, and outputs it to the register 233.

The register 233 holds the total bit length input from the adder circuit 232 as the valid data length c of the data for bit stream conversion stored in the register 224 and outputs it to the adder circuit 236.

The adder circuit 236 adds the data length c of the input data stored in the register 233 and the data length d' of the data before bit stream conversion selected by the selector 235 and stored in the register 227, detects the data length d stored in the register 227 at the next cycle, and outputs it to the register 237.

The register 237 holds the result of the addition input from the adder circuit 236 as the valid data d of the data stored in the register 227.

The subtractor circuit 234 subtracts 32 from the register 237 and outputs the result of the subtraction to the selector 235. The subtractor circuit 234 is a circuit for calculating the remaining number of bits when 32 bits of bit stream data are output from the register 227. Therefore, the output of the subtractor circuit 234 is selected by the selector 235 and becomes valid when data is output from the register 227.

The selector 235 selects the output data of the subtractor circuit 34 when the condition b≧32 stands, that is, when the unit of output, that is, 32 bits of data, is present at the register 22, selects the output of the register 237 when it does not stand, and outputs the data to the adder circuit 236. Due to this selector 235, a data length d' of the data before bit stream conversion stored in the register 227 is generated from the data length d of the data stored in the register 227 stored in the register 237.

In the bit stream generator 122b of this configuration, the input maximum length code is a combination of the 16 bits of the variable length data and the 11 bits of the added bit data, that is, 27 bits. Further, since the output is a fixed length of 8 bits, to output the 27 bits of data in 8-bit units, as the clock, use is made of the first clock CLK1 for data input and the second clock CLK2 for data output of a speed four times the first clock CLK1.

Next, the specific operation of the bit stream generator 122b of this configuration will be explained.

First, the operation of the bit stream generator 122b in the case where 16 bits of variable length data and 11 bits of added bit data are input when no valid data is stored in the register 227, that is, when the data in the register 237 is 0, will be explained with reference to FIG. 1 and FIG. 17.

Figure 16:
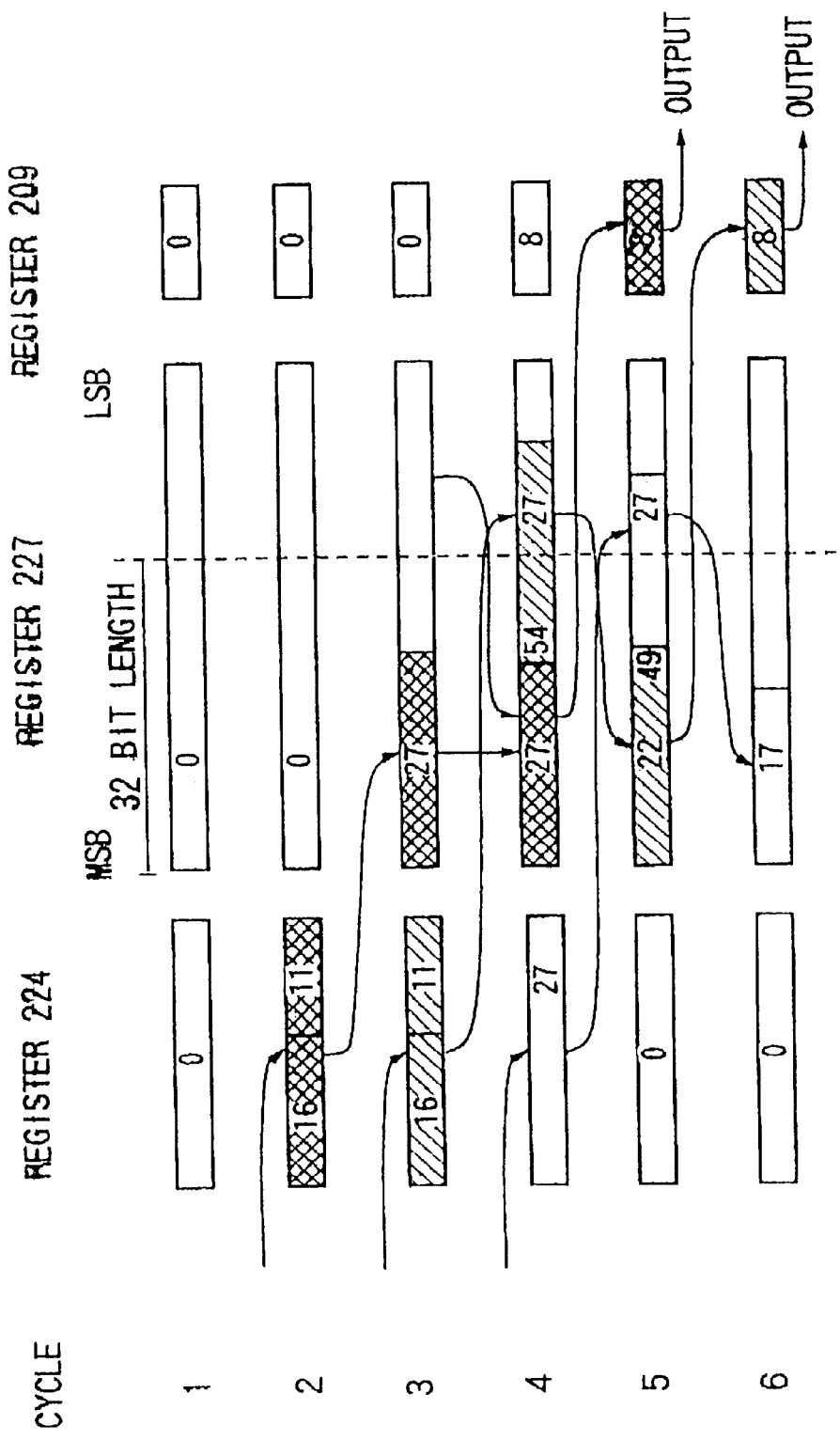
FIG. 16 is a view of the flow of the data among the main registers in a first specific example of the operation of the bit stream generator shown in FIG. 15.

FIG. 16 is a view of the flow of data among the main registers of the bit stream generator 122b in this case.

First, when 16 bits of variable length coded data and 11 bits of added bit data are input in a cycle 2 from the initial state of the cycle 1, the data is combined at the OR circuit 223 through the bit expander 2221 and shift register 222 and stored in the register 224.

At the cycle 3, the data which had been stored in the register 224 is transferred as it is to the register 227 and 27 bits of data comprised of the next 16 bits of variable length coded data and 11 bits of added bit data is stored in the register 224.

At the next cycle 4, the data stored in the register 224 is combined with the LSB side of the data stored in the register 227 and 27 bits of new data are stored in the register 224. At this time, the amount of data stored in the register 227 becomes 54 bits, that is, 32 bits of data to be output as a bit stream and 22 bits of data before bit stream conversion are stored.

At the next cycle 5, the higher 32 bits of data of the register 227 are successively selected by the selector 228 8 bits at a time and output through the register 229. The remaining 22 bits of data stored in the register 227 are shifted to the MSB side by the shift circuit 230, the 27 bits of data stored in the register 224 are shifted 22 bits to the LSB side by the shift circuit 225, these are combined at the OR circuit 226, and the resultant 49 bits of data are stored in the register 227.

At the cycle 6, the higher 32 bits of data of the 49 bits stored in the register 227 are successively selected by the selector 228 8 bits at a time and output through the register 229. Further, the remaining 17 bits of data stored in the register 227 are shifted to the MSB side by the shift circuit 230. In this cycle, no new data is stored in the register 224, so the data shifted by the shift circuit 230 is stored in the register 227 as it is.

In this way, the bit stream generator 122b can process three sets of 27 bits of variable length coded data, that is, 81 bits of data, and output 8 sets of 8 bits of fixed length output data in the four cycles of the cycle 2 to cycle 5 based on the first clock CLK1 (4 clocks).

Figure 17:
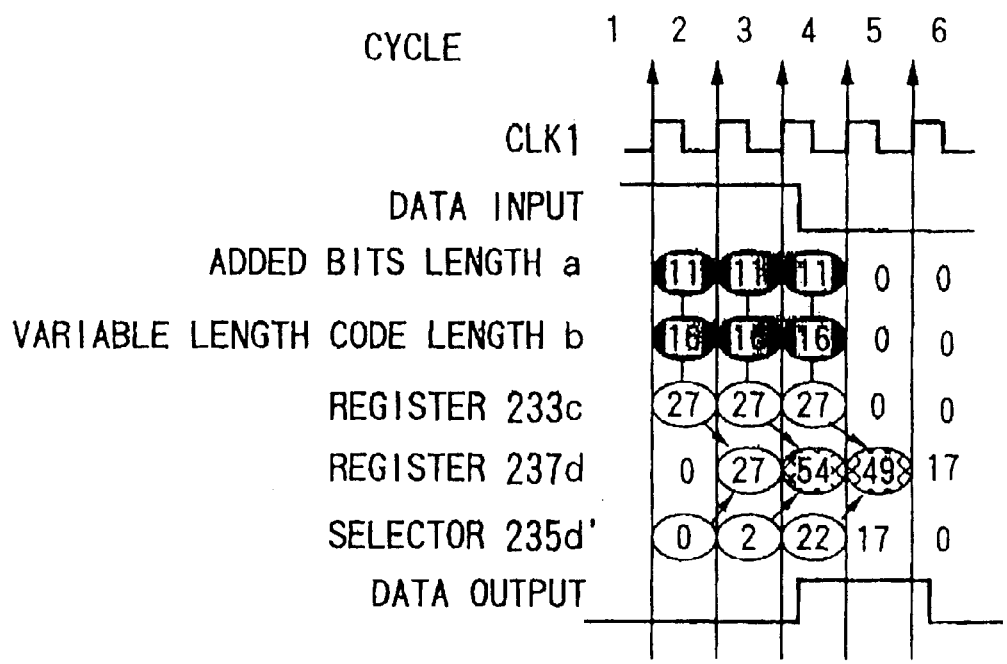
FIG. 17 is a view of the operation of the components relating to the control of the data length in a first specific example of the operation of the bit stream generator shown in FIG. 15.

The states of operation of the main registers and selectors of the data length control circuit performed by the circuits of the adder circuit 232 to the register 237 at the time of this processing are shown in FIG. 17.

Next, as an initial condition, 32 bits of data are stored in the register 227. That is, the operation of the bit stream generator 122b when the data in the register 237 consists of 31 bits and 16 bits of variable length coded data and 11 bits of added bit data are input will be explained with reference to FIG. 18 and FIG. 19.

Figure 18:
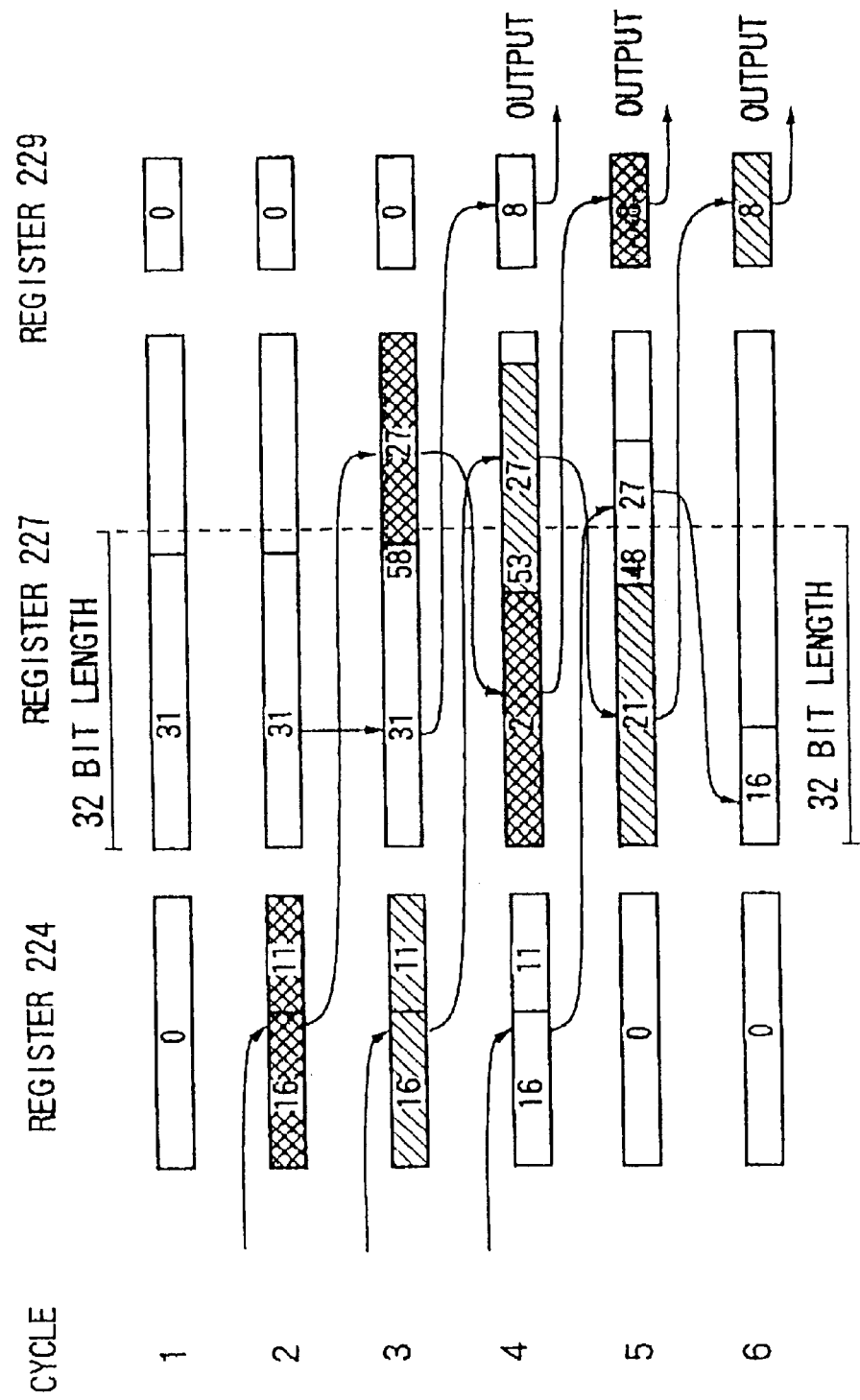
FIG. 18 is a view of the flow of the data among the main registers in a second specific example of the operation of the bit stream generator shown in FIG. 15.

FIG. 18 is a view of the flow of processing of data among the main registers of the bit stream generator 122b in this case.

First, when 16 bits of variable length coded data and 11 bits of added bit data are input at the cycle 2 from the initial state of the cycle 1, the data pass through the bit expander 221 and the shift circuit 222 and are combined by the OR circuit 223 and stored in the register 224.

At the cycle 3, the data stored in the register 224 is combined with the LSB side of the data stored in the register 227 and 27 bits of new data are stored in the register 224. The amount of data stored in the register 227 at this time becomes 58 bits, so 32 bits to be output as a bit stream and 26 bits of data before bit stream conversion are stored.

At the cycle 4, the higher 32 bits of data of the register 227 are successively selected by the selector 228 8 bits at a time and output through the register 229. Further, the remaining 26 bits of data stored in the register 227 are shifted to the MSB side at the shift circuit 230, the 27 bits of data stored in the register 224 are shifted 26 bits to the LSB side by the shift circuit 225, and these are combined at the OR circuit 226 and stored in the register 227 as 53 bits of data.

At this time, 27 bits of new data are stored in the register 224.

At the cycle 5, the higher 32 bits of the 53 bits stored in the register 227 are successively selected by the selector 228 8 bits at a time and output through the register 229. Further, the remaining 21 bits of data stored in the register 227 are shifted to the MSB side at the shift circuit 230, the 27 bits of data stored in the register 224 are shifted 21 bits to the LSB side by the shift circuit 225, and these are combined at the OR circuit 226 and stored in the register 227 as 48 bits of data.

At the cycle 6, the higher 32 bits of data of the 48 bits stored in the register 227 are successively selected by the selector 228 8 bits at a time and output through the register 229. Further, the remaining 16 bits of data stored in the register 227 are shifted to the MSB side at the shift circuit 230. In this cycle, no new data is stored in the register 224, so the data shifted by the shift circuit 230 is stored as it is in the register 227.

In this way, the bit stream generator 122b can process three sets of 27 bits of variable length coded data, that is, 81 bits of data, and output 12 sets of 8 bits of fixed length output data in the four cycles of the cycle 2 to cycle 5 based on the first clock CLK1 (four clocks).

The states of operation of the main registers and selectors of the data length control circuit performed in the adder circuit 232 to register 237 at the time of this processing are shown in FIG. 19.

A time chart of the time of output of data of the bit stream generator 122b is shown in FIG. 20.

The register 227 holds data starting in synchronization with the first clock CLK1, while the output register 229 holds data starting in synchronization with the second clock CLK2. The register 229 operates in four cycles and outputs four sets of data in one cycle of operation of the register 227, that is, one cycle of the first clock.

In this way, the bit stream generator 122b of the third embodiment can receive and process in parallel all together the two systems of variable length data of the variable length coded data and the added bit data, so the processing such as the generation of a select signal at the input side such as performed in the bit stream generator 122 of the second embodiment becomes unnecessary and the control at the input side becomes simpler.

Further, the input data can be successively input one set of data at a time in one cycle in synchronization with the first clock without any wait, so the control at the input side becomes simpler in this respect as well.

Further, the data can be output at a high speed synchronized with the output use second cycle. That is, it is possible to output four sets of 8-bit fixed length data in an input cycle.

Further, while the required capacities of the registers become larger, the circuit configuration of the bit stream generator 122b becomes simpler compared with the circuit configuration of the bit stream generator 122 and as a result the circuit becomes smaller, manufacture becomes easier, and the reliability is improved. These effects are extremely effective when providing the bit stream generator 122b on an LSI.

Further, as a result, it is possible to convert a stream of variable length data to a stream of fixed length data of predetermined bit lengths by a smaller circuit and by a simple configuration and control.

Note that the present invention is not limited to the present embodiments. Various modifications are possible.

For example, the specific circuit configuration of the bit stream generator shown in FIG. 8 and FIG. 15 in the second and third embodiments is not limited to those shown. Any suitable configuration is possible.

Further, the input and output data in the above-mentioned second and third embodiments were made 2 to 16 bits of variable length coded data and 0 to 11 bits of added bit data, but the range of the data size of the variable length data, the type of the data, etc. are not limited in any way.

Further, in the above embodiments, the example of converting one system or two systems of variable length data to a fixed length data stream was shown, but there may be three or more types of variable length data input.

Further, the data stream conversion apparatus and method according to the present invention may be applied to any variable length data. It may be applied to any coded data in addition to JPEG coded data or to any variable length data not the result of coding.

Further, the variable length coded data stream generation apparatus and method according to the present invention are also not limited to JPEG coding and image coding. Further, they are not limited to the camera system as illustrated in the second embodiment. They can be applied to any signal processing apparatuses including variable length coding.

Summarizing the effects of the invention, in this way, according to the present invention, it is possible to provide a data stream conversion apparatus and method for converting a stream of variable length data to a stream of fixed length data of a predetermined bit length by a smaller circuit and by a simple configuration and control.

Further, it is possible to provide a variable length coded data stream generation apparatus and method for coding desired data by variable length coding and generating a predetermined data stream efficiently by a simple configuration and control.

Further, it is possible to provide a camera system for capturing a desired image and coding the captured image data by variable length coding, in particular a camera system coding a captured image data by variable length coding and efficiently generating an image data stream by a smaller circuit and by a simple configuration and control.

What is claimed is:

1. A data stream conversion apparatus, comprising:
    a first data combining means for successively combining an input variable length data and a data portion not extracted as output data portion in already input data;
    a data extracting means for successively extracting predetermined data portions of the predetermined data length from said successively combined data as the output data portions; and
    an output means for successively outputting output data of a predetermined data length based on the successively extracted output data portions;
        whereby said first data combining means and said data extracting means operate in response to a first clock of a first frequency, and said output means operates in response to a second clock of a second frequency, said second frequency being different from said first frequency.

2. A data stream conversion apparatus as set forth in claim 1,
    wherein said input variable length data includes a plurality of sets of variable length data of different variable length,
    further comprising a second data combining means for combining the input plurality of sets of variable length data, and
    wherein said first data combining means combines data combined in said second data combining means and the data portion not extracted as output data portion in the already input data.

3. A data stream conversion apparatus as set forth in claim 2, wherein said data extracting means extracts said predetermined data portions of the predetermined data length from said combined data as said output data portion when the data combined in the first data combining means have said predetermined data length or more.

4. A data stream conversion apparatus as set forth in claim 3, wherein
    said data extracting means extracts said predetermined data portion of the predetermined data length from said combined data as said output data portion when the data combined in the first data combining means have the data length of a predetermined whole multiple or more of the data length of the output data and
    said output means successively selects and successively outputs said output data from said extracted output data portion.

5. A data stream conversion apparatus as set forth in claim 4, wherein
    said first data combining means, said second data combining means, and said data extracting means operate in response to said first clock of said first frequency and
    said output means operates in response to said second clock of said second frequency, and
    wherein said second frequency has a frequency that is at least said predetermined whole multiple of the first frequency.

6. A data stream conversion apparatus as set forth in claim 5,
    further comprising a first data storage means for storing data combined in said first data combining means,
    wherein said data extracting means extracts said output data portion of a predetermined data length from either an MSB side or an LSB side of the data stored in the first data storage means when the data combined at the first data combining means becomes said predetermined data length or more, and wherein said first data combining means comprises;
a first shift means for shifting said not extracted data portion of the data stored in the first data storage means to either the MSB side or the LSB side,
a second shift means for shifting the data combined at the second data combining means to a position continuing from a data position of the data of the not extracted portion shifted by said first shift means, and
a combining means for combining the not extracted data portion shifted at said first shift means and the data shifted by said second shift means.

7. A data stream conversion apparatus as set forth in claim 6, further comprising a data length processing means for detecting a data length of the data combined at said first data combining means and a data length of the data combined at said second data combining means, extracting said output data portion at said data extracting means, and detecting a data length of the not extracted data portion stored in the first data storage means based on data length information of an input plurality of sets of variable length data.

8. A data stream conversion method, comprising the steps of:
successively combining an input variable length data with a data portion not extracted as output data portion in already input data;
successively extracting predetermined data portions of the predetermined data length from said successively combined data as the output data portions; and
successively outputting output data of a predetermined data length based on the successively extracted output data portions;
whereby said steps of combining and extracting are performed according to a first clock of a first frequency, and said step of outputting is performed according to a second clock of a second frequency, said second frequency being different from said first frequency.

9. A data stream conversion method as set forth in claim 8,
wherein said input variable length data includes a plurality of sets of variable length data of different variable length,
further comprising the step of combining the input plurality of sets of variable length data in advance, and
wherein said combining of the input variable length data and the not extracted data portion is carried out by combining said data combined in advance and said data portions not extracted as output data portion in the already input data.

10. A data stream conversion method as set forth in claim 9, wherein said extracting of the output data portions is carried out by extracting said predetermined data portion of the predetermined data length from said combined data as said output data portion when the combined data has said predetermined data length or more.

11. A data stream conversion method as set forth in claim 10, wherein
said extracting of the output data portions is carried out by extracting said predetermined data portion of a predetermined data length from said combined data as said output data portion when the combined data have the data length of a predetermined whole multiple or more of the data length of the output data and said outputting of said data is carried out by successively selecting and outputting said output data from said extracted output data portion.

12. A variable length coded data stream generation apparatus, comprising:
a variable length coding means for coding desired data by variable length coding,
a first data combining means for successively combining the variable length coded data resulting from said variable length coding with a data portion not extracted as output data portion in already coded variable length coded data,
a data extracting means for successively extracting predetermined data portions of the predetermined data length from said successively combined variable length coded data as output data portions, and
an output means for successively outputting data of a predetermined fixed length based on the successively extracted output data portions;
whereby said first data combining means and said data extracting means operate in response to a first clock of a first frequency, and said output means operates in response to a second clock of a second frequency, said second frequency being different from said first frequency.

13. A variable length coded data stream generation apparatus as set forth in claim 12,
further comprising a second data combining means for combining the variable length coded data resulting from the variable length coding and other data supplementarily generated by said variable length coding, and
wherein said first data combining means combines data combined in said second data combining means and a portion not extracted as output data in the already input data.

14. A variable length coded data stream generation apparatus as set forth in claim 13, wherein
said variable length coding means codes input image data by a JPEG format to generate variable length coded data and added bit data, and
said second data combining means combines said generated variable length coded data and said added bit data.

15. A variable length coded data stream generation method, comprising the steps of:
coding desired data by variable length coding;
successively combining the variable length coded data resulting from said variable length coding with data portions not extracted as output data in already coded variable length coded data;
successively extracting predetermined data portions of a predetermined data length from said successively combined variable length coded data as output data portions; and
successively outputting data of a predetermined fixed length based on the successively extracted output data portions;
whereby said steps of combining and extracting are performed according to a first clock of a first frequency, and said step of outputting is performed according to a second clock of a second frequency, said second frequency being different from said first frequency.

16. A camera system comprising:
- a capturing means for capturing a desired image and generating image data;
- a variable length coding means for coding said generated image data by variable length coding;
- a first data combining means for successively combining variable length coded data resulting from said variable length coding with portions not extracted as output data portion in already captured variable length coded data;
- a data extracting means for successively extracting predetermined portions of a predetermined data length from said successively combined variable length coded data as the output data portions;
- a data stream generating means for successively generating data of a predetermined fixed length to generate a stream of image data based on the successively extracted output data portions; and
- a processing means for performing predetermined processing on said generated steam of image data;
- whereby said first data combining means and said data extracting means operate in response to a first clock of a first frequency, and said data stream generating means operates in response to a second clock of a second frequency, said second frequency being different from said first frequency.

17. A camera system as set forth in claim 16, wherein said processing means performs at least one processing of recording, reproduction and display, and transmission on said generated stream of image data.

* * * * *